(12) United States Patent
Moustafa et al.

(10) Patent No.: US 12,712,941 B2
(45) Date of Patent: Aug. 18, 2026

(54) SERVICE ROAMING BETWEEN EDGE COMPUTING PLATFORMS

(71) Applicant: Intel Corporation, Santa Clara, CA (US)

(72) Inventors: Hassnaa Moustafa, San Jose, CA (US); Francesc Guim Bernat, Barcelona (ES); Kshitij Arun Doshi, Tempe, AZ (US); Christian Maciocco, Portland, OR (US); Srikathyayani Srikanteswara, Portland, OR (US); Maruti Gupta Hyde, Portland, OR (US); Ned M. Smith, Beaverton, OR (US); Geng Wu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/953,954

(22) Filed: Sep. 27, 2022

(65) Prior Publication Data

US 2023/0018191 A1 Jan. 19, 2023

(51) Int. Cl.
*H04L 67/1004* (2022.01)
*H04L 67/1095* (2022.01)
*H04L 67/289* (2022.01)

(52) U.S. Cl.
CPC ...... *H04L 67/1004* (2013.01); *H04L 67/1095* (2013.01); *H04L 67/289* (2013.01)

(58) Field of Classification Search
CPC ............. H04L 67/1004; H04L 67/1095; H04L 67/289
See application file for complete search history.

(56) References Cited

U.S. PATENT DOCUMENTS

| | | | | |
|---|---|---|---|---|
| 10,198,250 | B1 * | 2/2019 | Sharma | G06F 16/9024 |
| 11,410,046 | B2 * | 8/2022 | Liu | G06N 3/006 |
| 11,425,054 | B1 * | 8/2022 | Dunsmore | H04L 47/828 |
| 11,711,727 | B1 * | 7/2023 | Gupta | H04W 76/11 370/329 |
| 11,765,244 | B1 * | 9/2023 | Barclay | H04L 67/51 709/226 |
| 11,778,053 | B1 * | 10/2023 | Allen | H04L 67/34 709/220 |
| 11,895,017 | B1 * | 2/2024 | Bashan | H04L 45/245 |

(Continued)

FOREIGN PATENT DOCUMENTS

| | | | | |
|---|---|---|---|---|
| EP | 3804276 B1 * | 2/2025 | | H04L 41/0897 |
| WO | WO-2019223869 A1 * | 11/2019 | | H04W 36/0033 |

OTHER PUBLICATIONS

Wang, Jianyu, et al. "Edge cloud offloading algorithms: Issues, methods, and perspectives." ACM Computing Surveys (CSUR) 52.1 (2019): 1-23.*

*Primary Examiner* — Jimmy H Tran
(74) *Attorney, Agent, or Firm* — Schwegman Lundberg & Woessner, P.A.

(57) ABSTRACT

Systems and techniques for service roaming between edge computing platforms are described herein. A service executing on a first edge computing platform may be identified to be migrated to a second edge computing platform. A first service component may be determined that is being executed by the first edge computing platform. Transmission of the service to the second edge platform may be initiated to execute a second service component for execution of the service.

24 Claims, 15 Drawing Sheets

(56) References Cited

U.S. PATENT DOCUMENTS 11,895,508 B1 * 2/2024 Qureshi ................ H04W 16/26
12,075,254 B1 * 8/2024 Gupta ................... H04W 12/37
12,137,353 B1 * 11/2024 Qureshi ............. H04B 7/18506
12,160,498 B1 * 12/2024 Lior ...................... H04J 3/0667
12,167,264 B1 * 12/2024 McEvilly ............ H04L 43/0876
12,192,274 B1 * 1/2025 Cowan .................. H04L 67/101
12,299,456 B1 * 5/2025 Liu ........................... G06F 8/61
12,432,606 B1 * 9/2025 Krasilnikov ........ H04W 88/085
2006/0120518 A1 * 6/2006 Baudino ............... H04L 67/303 379/91.02
2011/0231680 A1 * 9/2011 Padmanabhan ....... G06F 9/5077 709/224
2014/0067758 A1 * 3/2014 Boldyrev .............. G06F 9/5088 707/610
2014/0244853 A1 * 8/2014 Singh .................... H04L 7/0008 709/230
2019/0158606 A1 * 5/2019 Guim Bernat ........ H04W 40/36
2020/0264914 A1 * 8/2020 Dasgupta .............. H04L 41/342
2020/0320397 A1 * 10/2020 Liu ..................... H04L 41/5019
2020/0351337 A1 * 11/2020 Calmon .............. G06F 9/45558
2021/0314365 A1 * 10/2021 Smith ................... G06F 11/301
2021/0360057 A1 * 11/2021 Tofighbakhsh ..... H04L 67/1021
2021/0406696 A1 * 12/2021 Liu ....................... H04L 67/148
2022/0061059 A1 * 2/2022 Dunsmore ............ H04L 9/0897
2022/0129303 A1 * 4/2022 Wang .................... G06F 9/4881
2022/0166830 A1 * 5/2022 Sivakumar ............. H04L 43/10
2022/0188211 A1 * 6/2022 Gupta ................... G06F 9/5072
2022/0191303 A1 * 6/2022 Gupta ..................... H04L 67/61
2022/0192045 A1 * 6/2022 Naderi .................... G06F 1/189
2022/0229650 A1 * 7/2022 Albright ................... G06F 8/65
2022/0272043 A1 * 8/2022 Mishra ................... G06N 20/00
2022/0286854 A1 * 9/2022 Howe ................... H04W 12/08
2022/0326886 A1 * 10/2022 Baturin .............. C07K 16/2803
2022/0417172 A1 * 12/2022 Pentakota ............. H04L 47/803
2022/0417321 A1 * 12/2022 Pentakota ........... H04L 67/1001
2023/0018191 A1 * 1/2023 Moustafa ............ H04L 67/1095
2023/0053164 A1 * 2/2023 Kanitkar ............... H04W 36/12
2023/0061162 A1 * 3/2023 Goska .................. G05B 13/027
2023/0100729 A1 * 3/2023 Kostic ................... H04W 48/06 370/230
2023/0125892 A1 * 4/2023 Albright ................... G06F 8/65 713/1
2023/0164227 A1 * 5/2023 Mishra .................... H04L 67/51 709/201
2023/0199455 A1 * 6/2023 Schrider ............... H04W 48/18 455/414.1
2023/0208729 A1 * 6/2023 Gupta ................... H04W 24/02
2023/0269227 A1 * 8/2023 Bansal ................ H04L 63/0263 726/1
2023/0362056 A1 * 11/2023 Lucas ................. H04L 41/0813
2024/0022550 A1 * 1/2024 Raghuram ............ H04L 63/062
2024/0028414 A1 * 1/2024 Vasanad ................ G06F 9/5077
2024/0036934 A1 * 2/2024 Vasanad .................... G06F 8/61
2024/0069978 A1 * 2/2024 Singh .................... G06F 9/5066
2024/0168817 A1 * 5/2024 Bahirat ................. G06F 9/5072
2024/0171983 A1 * 5/2024 Gupta ................... H04W 16/02
2024/0205163 A1 * 6/2024 Smith ..................... G06F 9/465
2024/0236017 A1 * 7/2024 Guim Bernat ........ H04L 47/805
2024/0241960 A1 * 7/2024 King ....................... G06F 21/57
2024/0243924 A1 * 7/2024 Smith ..................... H04L 63/20
2024/0291895 A1 * 8/2024 Kim ........................ H04L 67/59
2024/0314620 A1 * 9/2024 Parulkar ............. H04L 43/0852
2024/0333618 A1 * 10/2024 Abhishek ............ H04L 41/5051
2024/0348684 A1 * 10/2024 Chen ....................... G06F 16/11
2024/0370251 A1 * 11/2024 Malladi ................... H04L 67/12
2024/0388512 A1 * 11/2024 Tesfatsion ........... H04L 41/0806
2024/0414049 A1 * 12/2024 Vasanad ............. H04L 41/0806
2025/0008328 A1 * 1/2025 Smith ................. H04L 41/5054
2025/0165283 A1 * 5/2025 Parulkar ............... H04W 4/029
2025/0184882 A1 * 6/2025 Gupta .................. H04W 4/021

* cited by examiner

| | SERVICE URI | SERVICE CHUNK URN | EDGE PLATFORM URN | FRESH TIMESTAMP |
|---|---|---|---|---|
| SERVICE A | | | | |
| SERVICE B | | | | |
| ...... | | | | |
| SERVICE N | | | | |

1000
1020
SERVICES NETWORK
SERVICES ON-BOARDING
1015
EDGE PLATFORM N
1025
PROGRAMMABLE SWITCH
1010
EDGE PLATFORM 2
1005
EDGE PLATFORM 1

SERVICE ROAMING BETWEEN EDGE COMPUTING PLATFORMS

TECHNICAL FIELD

Embodiments described herein generally relate to edge computing network service execution and, in some embodiments, more specifically to service roaming between edge computing platforms.

BACKGROUND

Traditional data center clouds provide flexible resources by organizing data center resources as virtualized large-scale networked computation and storage pools meet levels of demand with dynamically aggregated supply. Edge cloud computing reduces communication latencies by obviating a need for data to be ferried over the internet from locations at the edge to servers in traditional data center (DC) clouds, improves data security by keeping data on site, improves network backhaul traffic, and increases energy efficiency. The edge cloud brings computing resources closer to where they are needed such as from a mobile device, an internet of things (IoT) cluster, a smart home, a business premise, etc. by using computing resources from infrastructure operated by communication services providers (e.g., telecommunication providers, cable television companies, internet service providers (ISPs), etc.). The edge enabled services are delivered from cloud-like resource assemblies that federate across multiple infrastructure and services vendors and integrate value-added services provided by infrastructure and services vendors. Roaming capabilities are provided in an edge cloud and multi-provider environments to integrate support for mobile consumers and producers. Roaming capabilities draw upon capabilities that span across multiple edge locations and edge services providers.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
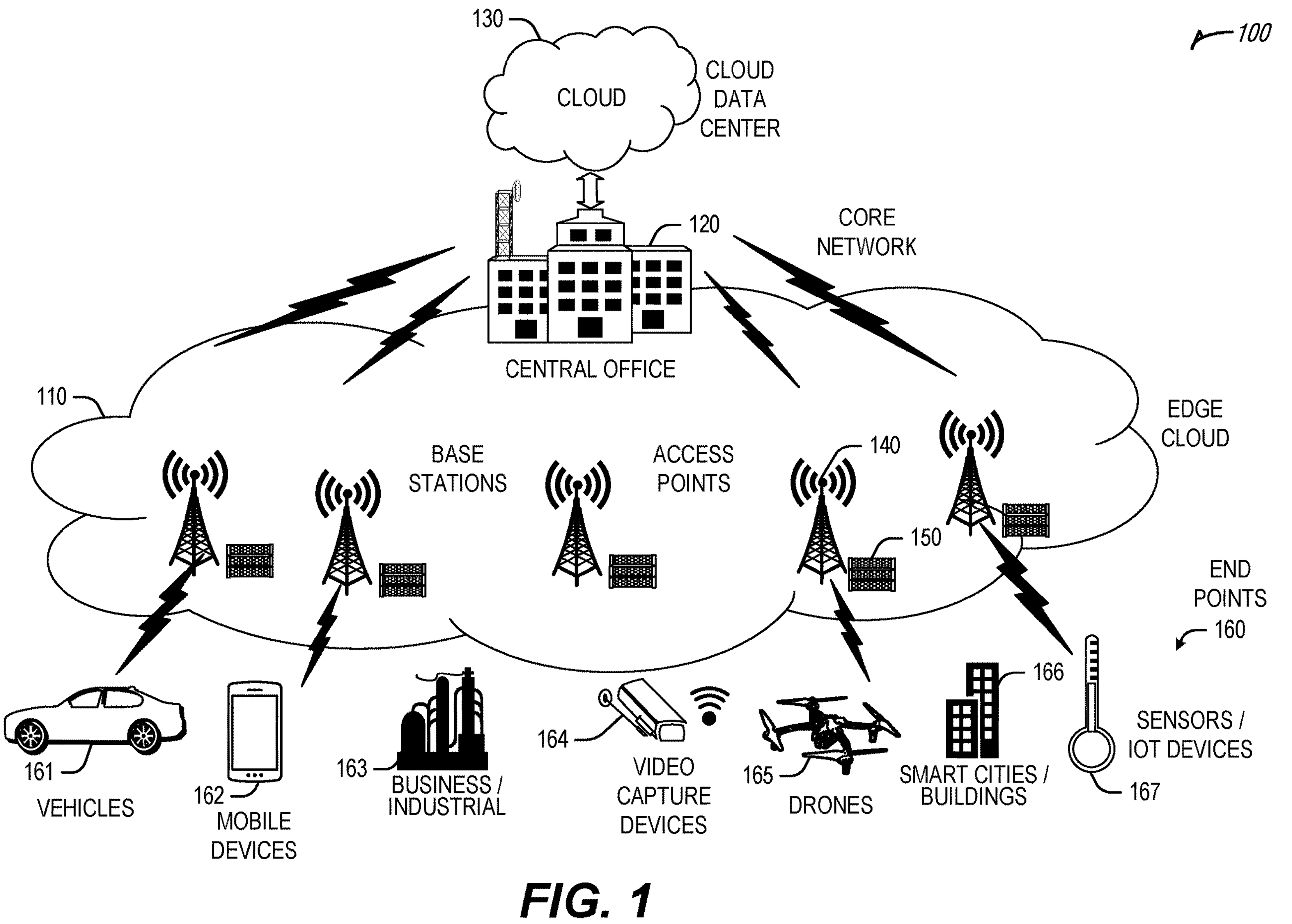
FIG. 1 illustrates an overview of an edge cloud configuration for edge computing.

Mobile users may use roaming sessions between network infrastructure belonging to different telecommunication providers and content delivery networks may offer point of presence services for multiple content delivery network (CDN) providers. It may be beneficial to users and providers to provide an ability for a service to roam from one edge platform to another edge platform. Service roaming between edge computing clusters ensures wide and seamless service coverage. Examples of services that may be roamed include, but are not limited to, video streaming to vehicles, high definition maps service to vehicles, augmented reality (AR)/virtual reality (VR) content to mobile users, cloud-based gaming, etc. The edge infrastructure may be improved to enable service roaming that supports mobile users providing elasticity and high availability. Elasticity and high availability are enabled by addressing edge capabilities that are not uniformly and richly resourced across locations or sufficiently available at all times to a service consumer.

Service roaming presents challenges beyond those addressed by mobile user session roaming and CDN point of presence services because interruption of a service flow may result in failure of service delivery. There are several scenarios for migration or roaming of service execution from one edge platform to another. In an example, a service may start with an original service provider edge computing platform and then migrate to another edge computing platform to enable better resources guarantees, to place the service closer to the end-consumer that may be mobile (e.g., reactive service roaming), or because capabilities may change as a result of new actions that may be requested by a user or triggered from the service implementation as a result of new events, etc.

In another example, a service request may start at a first (e.g., original, initial, beginning, etc.) service provider edge computing platform, be delegated by the first service provider to one or more second provider edge computing platforms, and/or be delegated later to a third provider edge computing platform, etc. The delegation of the service may be due to a provider whose platform the service is being delegated to may have more resources and may provide uncongested operation, has more function-as-a-service (FaaS) capabilities or more FaaS capacity, etc. (e.g., proactive service roaming).

In another example, a service may start on a first edge platform and roam to a second edge platform in order to consume fewer resources or to beneficially utilize background resources from the second edge computing platform (e.g., services roaming for best effort resources at low cost). Service roaming under this circumstance may provide network resiliency for other services with heavy resource utilization.

In yet another example, while throughput demands continue to rise, sustainability pressures drive use of green power/energy across edge computing platforms. Service roaming may be used to achieve high availability in environments with unpredictable and intermittent power. Service roaming migrates services from insufficiently/fluctuating powered edge platforms to a sufficiently backup-powered edge platform infrastructure.

The systems and techniques discussed herein provide a solution to enable service roaming in edge networks by providing orchestration within a federated edge computing network, extending networking support, using automated and intelligent services roaming decision making, and using new security and authentication arrangements within the edge network.

Current edge network solutions service deployment focus on services management and orchestration and do not provide service roaming across network edges or a federated infrastructure. The systems and techniques discussed herein enable a resilient edge computing infrastructure to facilitate service roaming through seamless access to services/service components. The solution discussed herein provides reactive service roaming for continuous sufficiency of resources and maximized proximity to service end-consumers, proactive service roaming for distributing serverless actions to facilitate load-balancing combined with streamlined invocation of event-triggered functions and simplified decentralized auto-scaling, best-effort service roaming for low cost and best-effort leveraging of available resources across the distributed and federated edge infrastructures, and authenticated secure access for safe, protected, and swift access to federated infrastructure from service components that roam.

Enablement of service roaming in edge networks using the systems and techniques discussed herein provides for wider deployment of edge computing. The flexibility of service roaming provides new opportunities for more additional contributors to participate in the federated edge computing infrastructure. For example, in addition to expansion of functionality for telecommunication providers, cloud service providers (CSPs), and hyperscalers (e.g., infrastructure-as-a-service (IaaS) providers, etc.), service roaming capability may provide streamlined access to the federated edge computing infrastructure to other service or resource providers that own edge data centers. Providers of specialized services at the edge may participate in extending the edge value chain. For example, differentiated FaaS applications may extend (e.g., add value to) services offered by other vendors without affecting the other vendors or consumers by furnishing infrastructure resources and acceleration-enabled FaaS. On-the-go services access and reduced cost services may be offered with best effort bandwidth, throughput, caching, buffering, etc. The systems and techniques also increase availability of green-powered utilization by allowing services to roam based on power efficiency, power fuel sources, sustainability, and the like.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
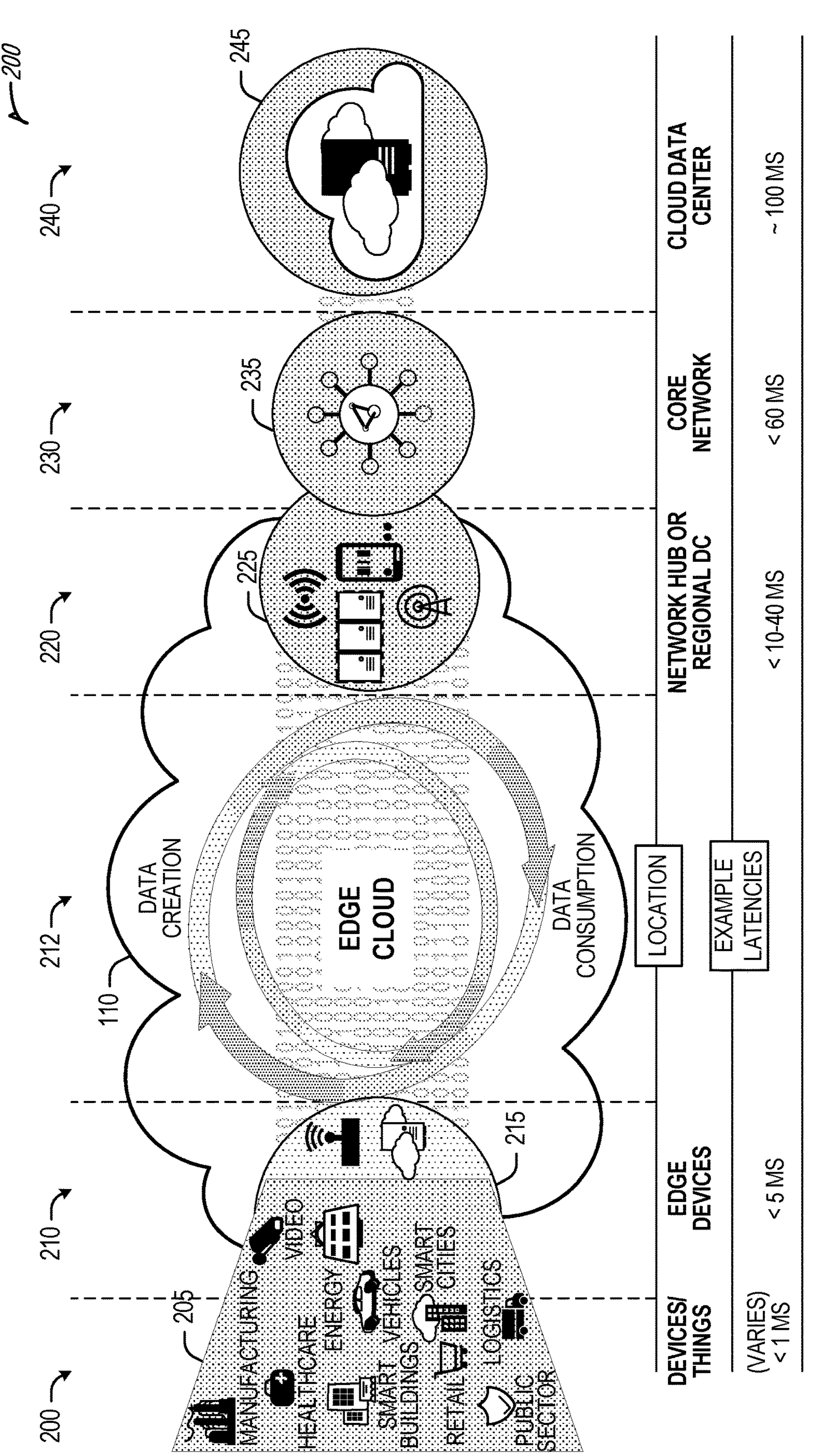
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a service component in the transaction is missing its agreed to SLA, the system as a whole (components in the transaction) may provide the ability to (1) understand the impact of the SLA violation, and (2) augment other service components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 7B. The edge cloud 110 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
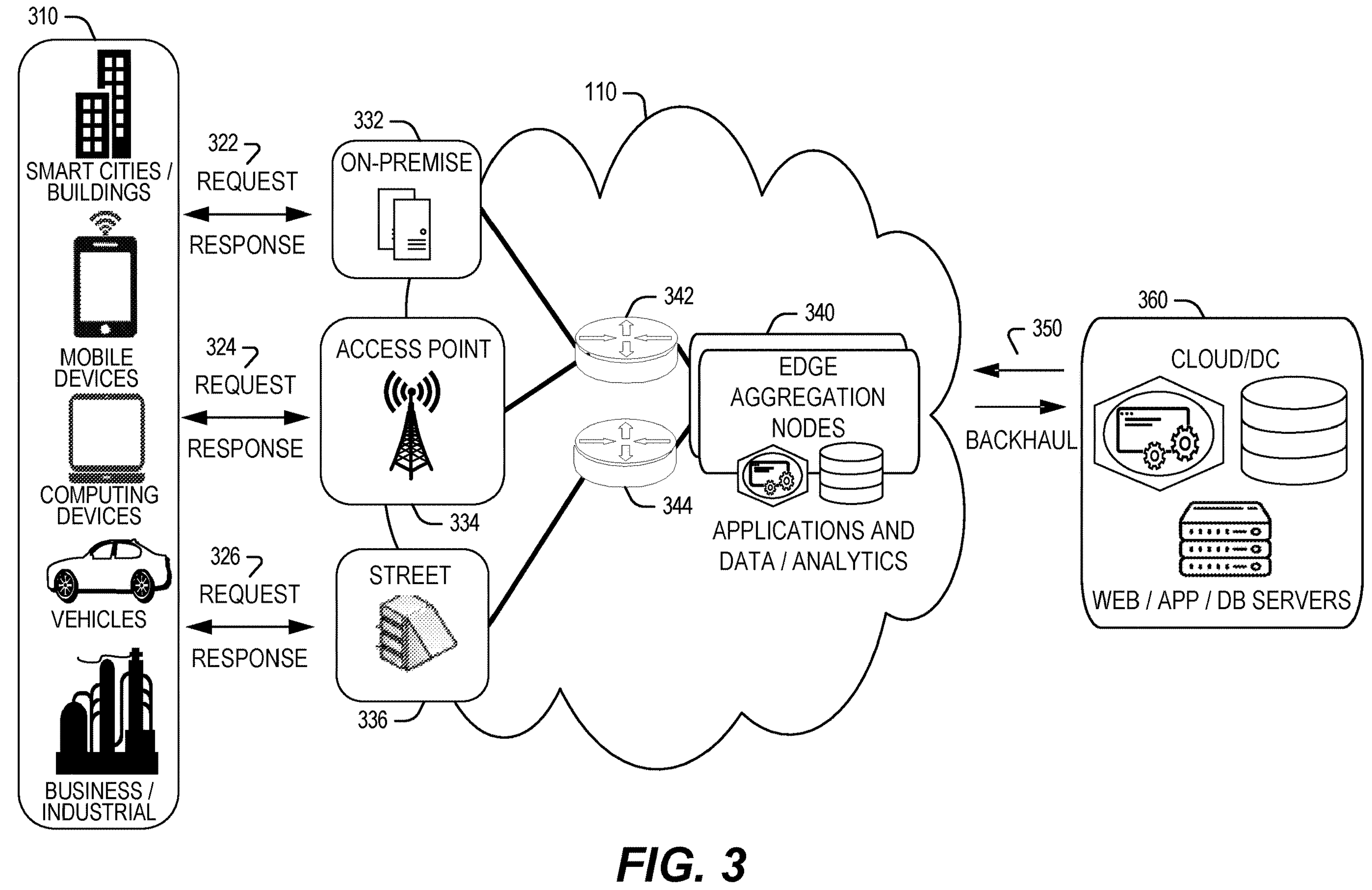
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
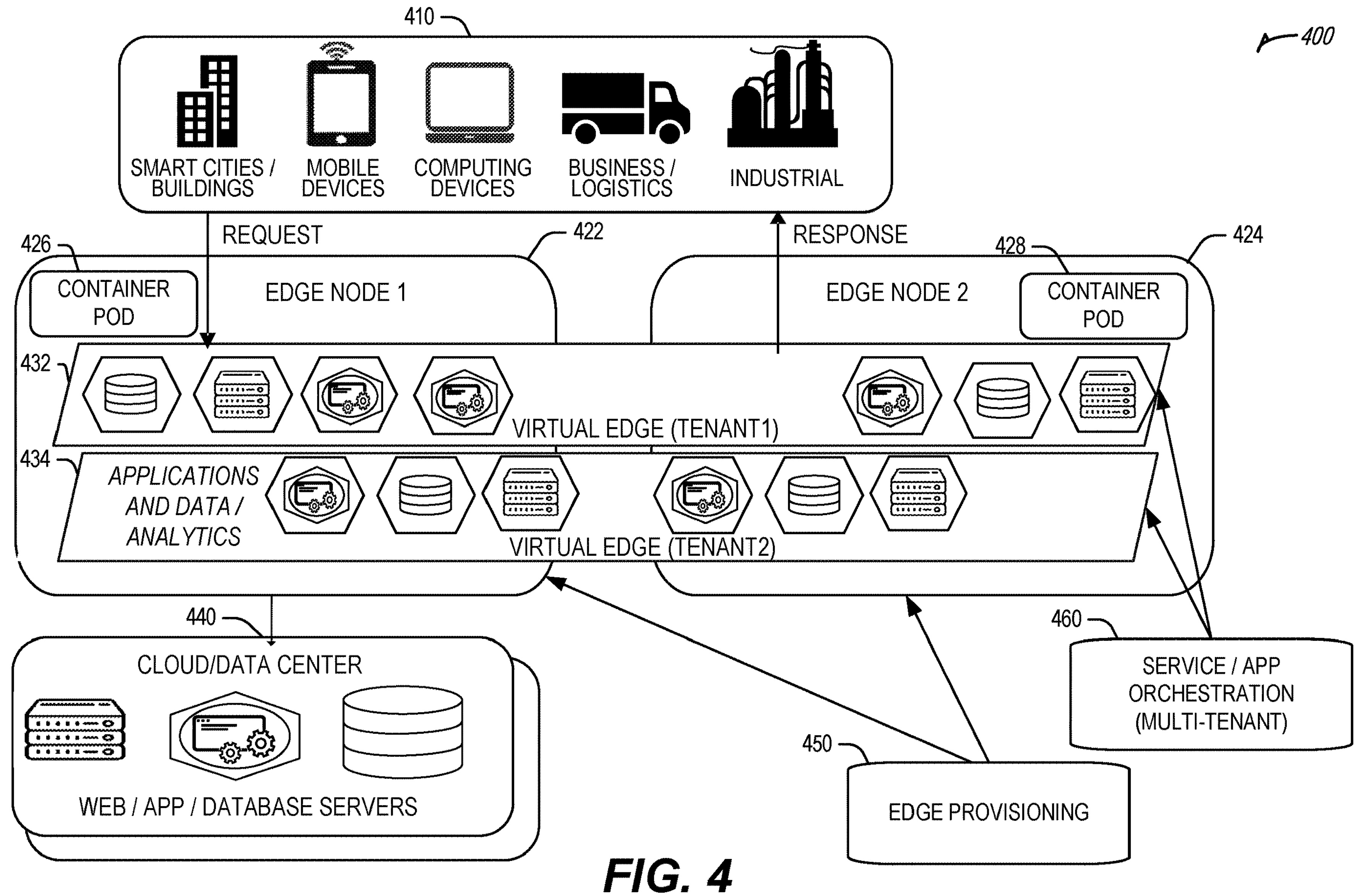
FIG. 4 illustrates deployment of a virtual edge configuration in an edge computing system operated among multiple edge nodes and multiple tenants.

FIG. 4 illustrates deployment and orchestration for virtual edge configurations across an edge computing system operated among multiple edge nodes and multiple tenants. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices in 410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective RoTs spanning devices 410, 422, and 440 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 5:
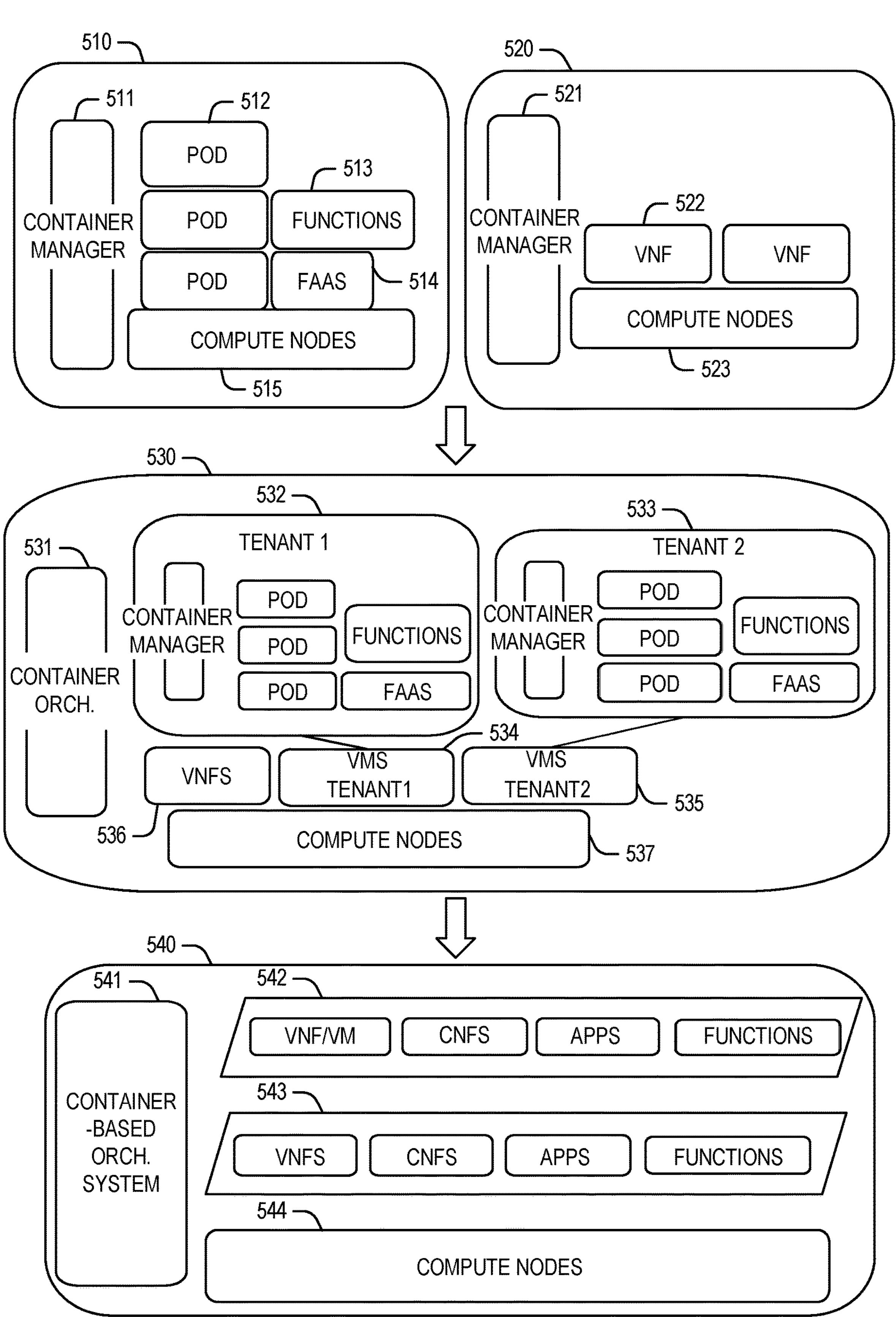
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via compute nodes (515 in arrangement 510), or to separately execute containerized virtualized network functions through execution via compute nodes (523 in arrangement 520). This arrangement is adapted for use of multiple tenants in system arrangement 530 (using compute nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by an container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
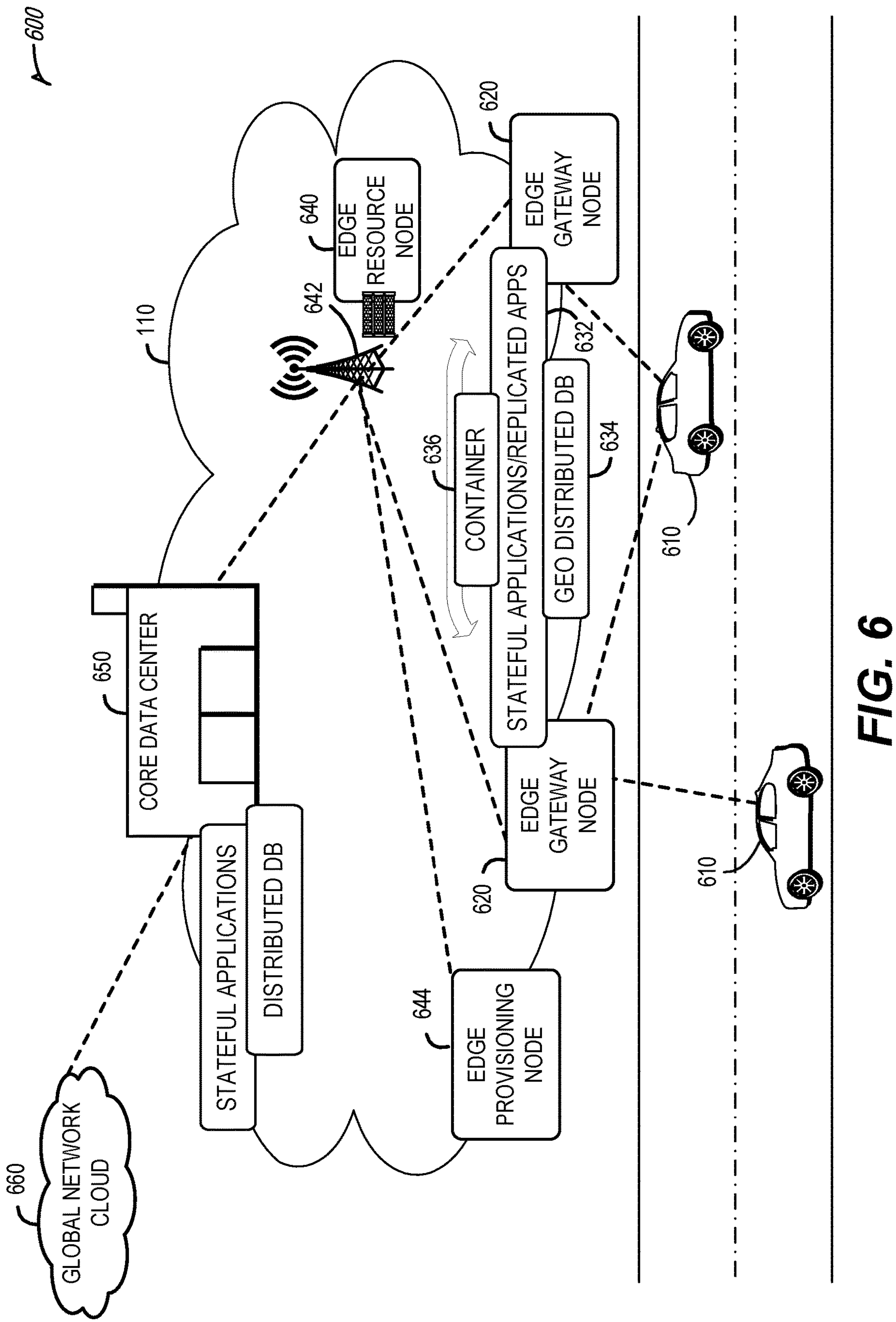
FIG. 6 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 6 shows a simplified vehicle compute and communication use case involving mobile access to applications in an edge computing system 600 that implements an edge cloud 110. In this use case, respective client compute nodes 610 may be embodied as in-vehicle compute systems (e.g., in-vehicle navigation and/or infotainment systems) located in corresponding vehicles which communicate with the edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 610 and a particular edge gateway device 620 may propagate so as to maintain a consistent connection and context for the client compute node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client compute nodes 610 may be performed on one or more of the edge gateway devices 620.

The edge gateway devices 620 may communicate with one or more edge resource nodes 640, which are illustratively embodied as compute servers, appliances or hardware components located at or in a communication base station 642 (e.g., a based station of a cellular network). As discussed above, the respective edge resource nodes 640 include an amount of processing and storage capabilities and, as such, some processing and/or storage of data for the client compute nodes 610 may be performed on the edge resource node 640. For example, the processing of data that is less urgent or important may be performed by the edge resource node 640, while the processing of data that is of a higher urgency or importance may be performed by the edge gateway devices 620 (depending on, for example, the capabilities of each hardware component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other hardware components located in a central location (e.g., a central office of a cellular communication network). The core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource nodes 640 may offer the use of stateful applications 632 and a geographic distributed database 634. Although the applications 632 and database 634 are illustrated as being horizontally distributed at a layer of the edge cloud 110, it will be understood that resources, services, or other service components of the application may be vertically distributed throughout the edge cloud (including, part of the application executed at the client compute node 610, other parts at the edge gateway nodes 620 or the edge resource nodes 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from an edge node 620 to other edge nodes (e.g., 620, 640, etc.) such that the container with an application and workload does not need to be reconstituted, re-compiled, re-interpreted in order for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 782 of FIG. 7B, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Service component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 782 of FIG. 7B. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 782 of FIG. 7B, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer readable instructions 782 from the edge provisioning node 644. For example, the software instructions, which may correspond to the example computer readable instructions 782 of FIG. 7B, may be downloaded to the example processor platform/s, which is to execute the computer readable instructions 782 to implement the methods described herein.

In some examples, the processor platform(s) that execute the computer readable instructions 782 can be physically located in different geographic locations, legal jurisdictions, etc. In some examples, one or more servers of the edge provisioning node 644 periodically offer, transmit, and/or force updates to the software instructions (e.g., the example computer readable instructions 782 of FIG. 7B) to ensure improvements, patches, updates, etc. are distributed and applied to the software instructions implemented at the end user devices. In some examples, different software components of the computer readable instructions 782 can be distributed from different sources and/or to different processor platforms; for example, different libraries, plug-ins, software components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the hardware components depicted in FIGS. 7A and 7B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 7A:
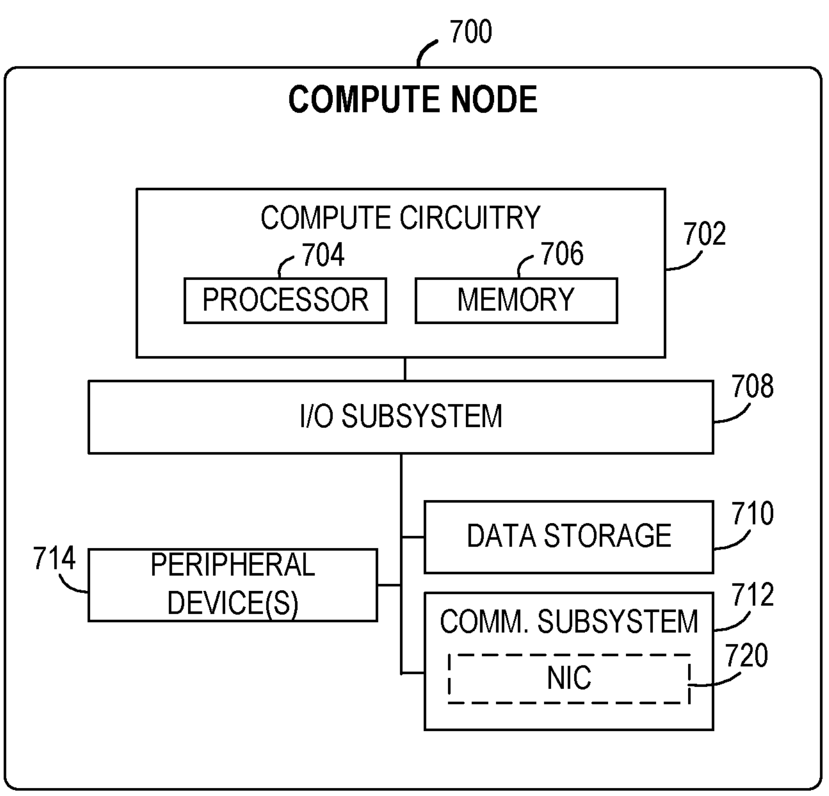
FIG. 7A provides an overview of example hardware components for compute deployed at a compute node in an edge computing system.

In the simplified example depicted in FIG. 7A, an edge compute node 700 includes a compute engine (also referred to herein as "compute circuitry") 702, an input/output (I/O) subsystem 708, data storage 710, a communication circuitry subsystem 712, and, optionally, one or more peripheral devices 714. In other examples, respective compute devices may include other or additional hardware components, such as those typically found in a computer (e.g., a display, peripheral devices, etc.). Additionally, in some examples, one or more of the illustrative hardware components may be incorporated in, or otherwise form a portion of, another hardware component.

The compute node 700 may be embodied as any type of engine, device, or collection of devices capable of performing various compute functions. In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing an application). For example, the processor 704 may be embodied as a multi-core processor(s), a microcontroller, a processing unit, a specialized or special purpose processing unit, or other processor or processing/controlling circuit.

In some examples, the processor 704 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 704 may work in coordination with each other to execute many types of operations and instructions within and on behalf of the compute node 700.

The memory 706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 706 may be integrated into the processor 704. The memory 706 may store various software and data used during operation such as one or more applications, data operated on by the application(s), libraries, and drivers.

The compute circuitry 702 is communicatively coupled to other hardware components of the compute node 700 via the I/O subsystem 708, which may be embodied as circuitry and/or hardware components to facilitate input/output operations with the compute circuitry 702 (e.g., with the processor 704 and/or the main memory 706) and other hardware components of the compute circuitry 702. For example, the I/O subsystem 708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other hardware components and subsystems to facilitate the input/output operations. In some examples, the I/O subsystem 708 may form a portion of a system-on-a-chip (SoC) and be incorporated, along with one or more of the processor 704, the memory 706, and other hardware components of the compute circuitry 702, into the compute circuitry 702.

The one or more illustrative data storage devices 710 may be embodied as any type of devices configured for short-term or long-term storage of data such as, for example, memory devices and circuits, memory cards, hard disk drives, solid-state drives, or other data storage devices. Individual data storage devices 710 may include a system partition that stores data and firmware code for the data storage device 710. Individual data storage devices 710 may also include one or more operating system partitions that store data files and executables for operating systems depending on, for example, the type of compute node 700.

The communication circuitry 712 may be embodied as any communication circuit, device, or collection thereof, capable of enabling communications over a network between the compute circuitry 702 and another compute device (e.g., an edge gateway of an implementing edge computing system). The communication circuitry 712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 712 includes a network interface controller (NIC) 720, which may also be referred to as a host fabric interface (HFI). The NIC 720 may be embodied as one or more add-in-boards, daughter cards, network interface cards, controller chips, chipsets, or other devices that may be used by the compute node 700 to connect with another compute device (e.g., an edge gateway node). In some examples, the NIC 720 may be embodied as part of a system-on-a-chip (SoC) that includes one or more processors, or included on a multichip package that also contains one or more processors. In some examples, the NIC 720 may include a local processor (not shown) and/or a local memory (not shown) that are both local to the NIC 720. In such examples, the local processor of the NIC 720 may be capable of performing one or more of the functions of the compute circuitry 702 described herein. Additionally, or alternatively, in such examples, the local memory of the NIC 720 may be integrated into one or more hardware components of the client compute node at the board level, socket level, chip level, and/or other levels.

Additionally, in some examples, a respective compute node 700 may include one or more peripheral devices 714. Such peripheral devices 714 may include any type of peripheral device found in a compute device or server such as audio input devices, a display, other input/output devices, interface devices, and/or other peripheral devices, depending on the particular type of the compute node 700. In further examples, the compute node 700 may be embodied by a respective edge compute node (whether a client, gateway, or aggregation node) in an edge computing system or like forms of appliances, computers, subsystems, circuitry, or other hardware components.

Figure 7B:
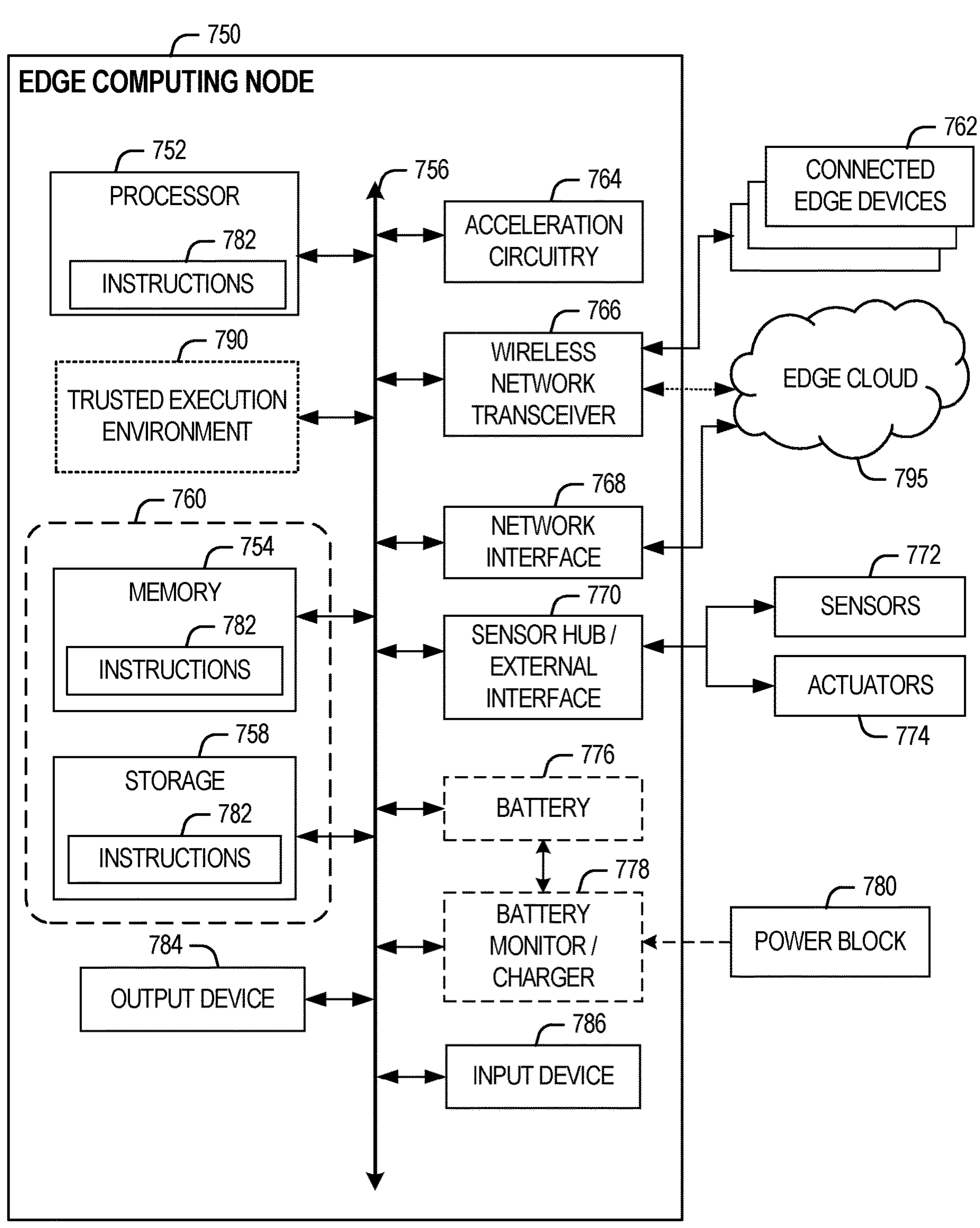
FIG. 7B provides a further overview of example hardware components within a computing device in an edge computing system.

In a more detailed example, FIG. 7B illustrates a block diagram of an example of hardware components that may be present in an edge computing node 750 for implementing the techniques (e.g., operations, processes, methods, and methodologies) described herein. This edge computing node 750 provides a closer view of the respective hardware components of node 700 when implemented as or as part of a computing device (e.g., as a mobile device, a base station, server, gateway, etc.). The edge computing node 750 may include any combinations of the hardware or logical components referenced herein, and it may include or couple with any device usable with an edge communication network or a combination of such networks. The logic components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 750, or as hardware components otherwise incorporated within a chassis of a larger system.

The edge computing device 750 may include processing circuitry in the form of a processor 752, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 752 may be a part of a system on a chip (SoC) in which the processor 752 and other logic components are formed into a single integrated circuit, or a single package, such as the Edison™ or Galileo™ SoC boards from Intel Corporation, Santa Clara, California. As an example, the processor 752 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 752 and accompanying circuitry may be provided in a single socket form factor, multiple socket form factor, or a variety of other formats, including in limited hardware configurations or configurations that include fewer than all elements shown in FIG. 7B.

The processor 752 may communicate with a system memory 754 over an interconnect 756 (e.g., a bus). Any number of memory devices may be used to provide for a given amount of system memory. As examples, the memory 754 may be random access memory (RAM) in accordance with a Joint Electron Devices Engineering Council (JEDEC)

design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example, the storage 758 may be implemented via a solid-state disk drive (SSDD). Other devices that may be used for the storage 758 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The hardware components may communicate over the interconnect 756. The interconnect 756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 756 may couple the processor 752 to a transceiver 766, for communications with the connected edge devices 762. The transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the edge computing node 750 may communicate with close devices, e.g., within about 10 meters, using a local transceiver based on Bluetooth Low Energy (BLE), or another low power radio, to save power. More distant connected edge devices 762, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 766 (e.g., a radio transceiver) may be included to communicate with devices or services in the edge cloud 795 via local or wide area network protocols. The wireless network transceiver 766 may be a low-power wide-area (LPWA) transceiver that follows the IEEE 802.15.4, or IEEE 802.15.4g standards, among others. The edge computing node 750 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 766, as described herein. For example, the transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 768 may be included to provide a wired communication to nodes of the edge cloud 795 or to other devices, such as the connected edge devices 762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 768 may be included to enable connecting to a second network, for example, a first NIC 768 providing communications to the cloud over Ethernet, and a second NIC 768 providing communications to other devices over another type of network.

Given the variety of types of applicable communications from the device to another hardware component or network, applicable communications circuitry used by the device may include or be embodied by any one or more of hardware components 764, 766, 768, or 770. Accordingly, in various examples, applicable means for communicating (e.g., receiving, transmitting, etc.) may be embodied by such communications circuitry.

The edge computing node 750 may include or be coupled to acceleration circuitry 764, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 756 may couple the processor 752 to a sensor hub or external interface 770 that is used to connect additional devices or subsystems. The devices may include sensors 772, such as accelerometers, level sensors, flow sensors, optical light sensors, camera sensors, temperature sensors, global navigation system (e.g., GPS) sensors, pressure sensors, barometric pressure sensors, and the like. The hub or interface 770 further may be used to connect the edge computing node 750 to actuators 774, such as power switches, valve actuators, an audible sound generator, a visual warning device, and the like.

In some optional examples, various input/output (I/O) devices may be present within or connected to, the edge computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 750. A display or console hardware, in the context of the present system, may be used to provide output and receive input of an edge computing system; to manage hardware/software components or services of an edge computing system; identify a state of an edge computing component or service; or to conduct any other number of management or administration functions or service use cases.

A battery 776 may power the edge computing node 750, although, in examples in which the edge computing node 750 is mounted in a fixed location, it may have a power supply coupled to an electrical grid, or the battery may be used as a backup or for temporary capabilities. The battery 776 may be a lithium ion battery, or a metal-air battery, such as a zinc-air battery, an aluminum-air battery, a lithium-air battery, and the like.

A battery monitor/charger 778 may be included in the edge computing node 750 to track the state of charge (SoCh) of the battery 776, if included. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 778 may communicate the information on the battery 776 to the processor 752 over the interconnect 756. The battery monitor/charger 778 may also include an analog-to-digital (ADC) converter that enables the processor 752 to directly monitor the voltage of the battery 776 or the current flow from the battery 776. The battery parameters may be used to determine actions that the edge computing node 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the edge computing node 750. A wireless battery charging circuit, such as an LTC4020 chip from Linear Technologies of Milpitas, California, among others, may be included in the battery monitor/charger 778. The specific charging circuits may be selected based on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application specific integrated circuit (ASIC).

In an example, the instructions 782 provided via the memory 754, the storage 758, or the processor 752 may be embodied as a non-transitory, machine-readable medium 760 including code to direct the processor 752 to perform electronic operations in the edge computing node 750. The processor 752 may access the non-transitory, machine-readable medium 760 over the interconnect 756. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processor 752 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 782 on the processor 752 (separately, or in combination with the instructions 782 of the machine readable medium 760) may configure execution or operation of a trusted execution environment (TEE) 790. In an example, the TEE 790 operates as a protected area accessible to the processor 752 for secure execution of instructions and secure access to data. Various implementations of the TEE 790, and an accompanying secure area in the processor 752 or the memory 754 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 750 through the TEE 790 and the processor 752.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 7C:
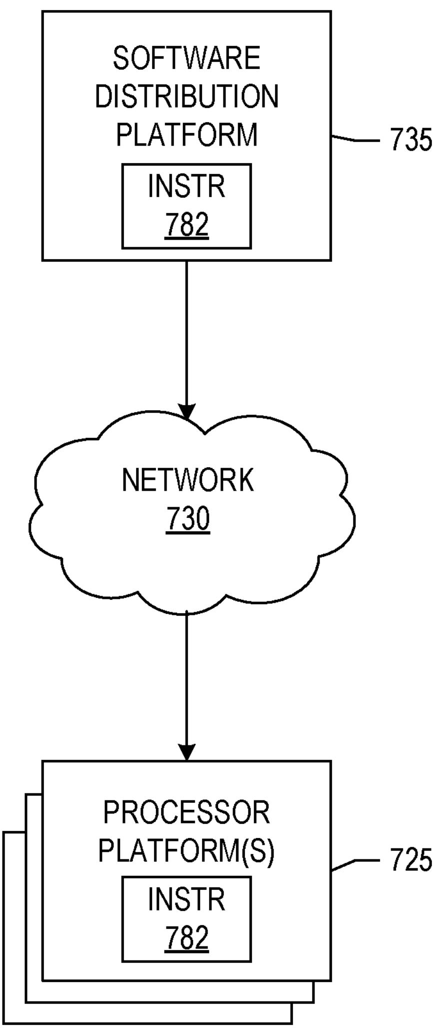
FIG. 7C illustrates an example software distribution platform to distribute software to one or more devices.

FIG. 7C illustrates an example software distribution platform 735 to distribute software, such as the example computer readable instructions 782 of FIG. 7B, to one or more devices, such as example processor platform(s) 735 and/or example connected Edge devices 310 of FIG. 3. The example software distribution platform 735 may be implemented by any computer server, data facility, cloud service, etc., capable of storing and transmitting software to other computing devices (e.g., third parties, the example connected Edge devices 310 of FIG. 3). Example connected Edge devices may be customers, clients, managing devices (e.g., servers), third parties (e.g., customers of an entity owning and/or operating the software distribution platform 735). Example connected Edge devices may operate in commercial and/or home automation environments. In some examples, a third party is a developer, a seller, and/or a licensor of software such as the example computer readable instructions 782 of FIG. 7B. The third parties may be consumers, users, retailers, OEMs, etc., that purchase and/or license the software for use and/or re-sale and/or sub-licensing. In some examples, distributed software causes display of one or more user interfaces (UIs) and/or graphical user interfaces (GUIs) to identify the one or more devices (e.g., connected Edge devices) geographically and/or logically separated from each other (e.g., physically separated IoT devices chartered with the responsibility of water distribution control (e.g., pumps), electricity distribution control (e.g., relays), etc.).

In the illustrated example of FIG. 7C, the software distribution platform 735 includes one or more servers and one or more storage devices. The storage devices store the computer readable instructions 782, which may correspond to the example computer readable instructions, as described above. The one or more servers of the example software distribution platform 735 are in communication with a network 730, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or via a third-party payment entity. The servers enable purchasers and/or licensors to download the computer readable instructions 782 from the software distribution platform 735. For example, the software, which may correspond to the example computer readable instructions, may be downloaded to the example processor platform(s) 735 (e.g., example connected Edge devices), which is/are to execute the computer readable instructions 782 to implement the service roaming between edge computing platforms. In some examples, one or more servers of the software distribution platform 735 are communicatively connected to one or more security domains and/or security devices through which requests and transmissions of the example computer readable instructions 782 must pass. In some examples, one or more servers of the software distribution platform 735 periodically offer, transmit, and/or force updates to the software (e.g., the example computer readable instructions 782 of FIG. 7B) to ensure improvements, patches, updates, etc., are distributed and applied to the software at the end user devices.

In the illustrated example of FIG. 7C, the computer readable instructions 782 are stored on storage devices of the software distribution platform 735 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 782 stored in the software distribution platform 735 are in a first format when transmitted to the example processor platform(s) 735. In some examples, the first format is an executable binary in which particular types of the processor platform(s) 735 can execute. However, in some examples, the first format is uncompiled code that requires one or more preparation tasks to transform the first format to a second format to enable execution on the example processor platform(s) 735. For instance, the receiving processor platform(s) 735 may need to compile the computer readable instructions 782 in the first format to generate executable code in a second format that is capable of being executed on the processor platform(s) 735. In still other examples, the first format is interpreted code that, upon reaching the processor platform(s) 735, is interpreted by an interpreter to facilitate execution of instructions.

Figure 8:
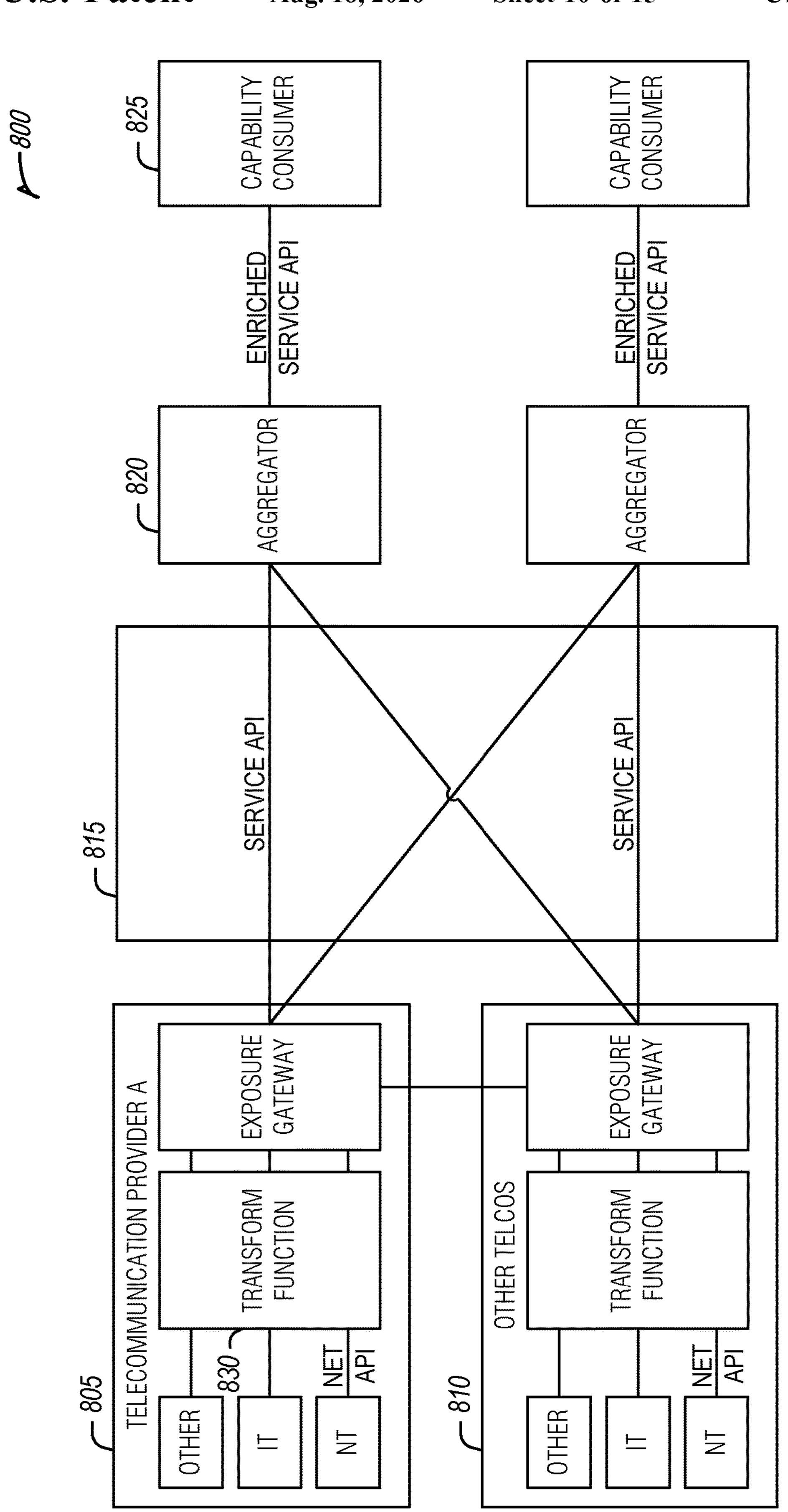
FIG. 8 is a block diagram of an example of an architecture for service roaming between edge computing platforms, according to an embodiment.

FIG. 8 is a block diagram of an example of an architecture 800 for service roaming between edge computing platforms, according to an embodiment. The use case 800 may employ features and components as discussed in FIGS. 1 to 7C.

The architecture 800 provides interoperability and compute federation across multiple cloud service providers (CSPs) and telecommunication providers such as telecommunication provider A 805 and other telecommunication providers 810. The architecture 800 defines application programming interfaces (APIs) across various partners that may be part of a federated edge. Service APIs 815 may include mapping tables for attributes for APIs from the telecommunication provider A 805 to APIs from the other telecommunication providers 810 to provide seamless service roaming. A transformation function 830 may be used that may include logic that calls the APIs from the other telecommunication providers 810, transforms the data, and provides a function for the Service APIs 815. The architecture 800 maps internet protocol (IP) elements that may be mapped for the service APIs 815. These features allow service roaming to an aggregator 820 (or directly) to a capability consumer 825 (e.g., a device, etc. that consumes service content, etc.).

Service roaming enables continuous and enhanced service coverage by an edge infrastructure that may be federated by edge platforms from multiple network/solution providers. The systems and techniques discussed herein enable service roaming across edge platforms in an intelligent and contextual manner to provide continuous service availability, service level agreement (SLA) delivery, with security and privacy. The systems and techniques discussed herein address mobile users where both the service and the users roam and stationary users where users are stationary but the service roams to achieve a defined level of quality (e.g., an SLA, etc.) or best effort quality. In both scenarios, service roaming may be trigger reactively, proactively, or to provide best effort service while ensuring security and privacy.

The systems and techniques discussed herein user service chunks to partition service execution to enable roaming. A service chunk is one or more microservices or service components for a service being consumed over a certain period of time during a service session. Stateless service components may be used that may be extended to a set of lightly stateful service components with each structured as a finite state automaton. Thus, execution of a service may be partitioned into service components and the service may be structured as a web of one or more interacting service chunks. FaaS actions or functions are an example of a service chunk. Another example of a service chunk is a microservice that receives queued invocations or events, performs handling of each event or invocation within a bounded length of time, and uses a bounded quantity of resources like power or memory.

To move a service chunk from one point P1 (e.g., the telecommunications provider A 805, etc.) to another point P2 (e.g., a telecommunication provider of the other telecommunication providers 810, etc.), it is not necessary to preempt its execution at P1. Instead of preempting execution, a service chunk that is currently active may run until it has completed handling the event or invocations that it has already received (additionally or alternatively, de-queued and begun to process) at P1 and P1 may pause execution. An orchestrator or a service roaming coordinator suspends execution of the service chunk at P1 (e.g., passivates it at P1) and activates the service chunk at P2. When the activation of the service chunk at P2 has been resumed, the paused version of the service chunk at P1 may optionally be terminated. Migration for a service chunk that has a certain amount of context in the form of its private state may be accomplished by copying over the private state from P1 to P2.

Where $C_a$ and $C_b$ are two service chunks within a service, $C_a$ and $C_b$ may be migrated independently and run at the same or different locations because any communication between $C_a$ and $C_b$ occurs explicitly through identifiable APIs or operations and is not tacitly signaled through global variables referred from $C_a$ and $C_b$. Thus, even if $C_a$ and $C_b$ are service chunks of a single service, interaction proceeds through a networking interface and is interceptable and redirectable.

Generally a piece of software (e.g., a module, a service chunk, a microservice, etc.) has at least three different groups of mutable variables—a) those that cache values which can be recomputed if needed, b) those that hold values which change during the course of a computation, but are not important to preserve at the end of the computation because a next computation by the same thread or process starts with a reinitialization of the variables from starting values like 0, −1, NULL, etc.—this is common in cases where a thread or a process is going to be assigned a task to complete, and when it completes that task it returns to a pool of threads or processes waiting to be assigned a next task in the same application (sometimes called worker pool systems), c) those that carry information which is per-user, per-open-connection, per-security-descriptor, etc., which cannot be reinitialized from scratch—essentially these are context dependent values that require some externally visible interaction with a user, a requestor, a security domain, etc., if they need to be reinitialized—for example, when a connection breaks and information has to be reobtained from a user in order to build a fresh connection, reestablish a secure channel etc. In some applications designed for representational state transfer (REST)-ful interactions, usually the amount of information (c) is a tiny fraction of the total number of mutable variables across all (a, b, c) usages. During a handoff of a service during roaming, these variables are communicated to the next instance of the service chunk if the execution of this service chunk is migrated; not communicating (a) is fine because those are recomputable values, and not communicating (b) is ok because the point (e.g., timing) of migration is chosen where the currently pending tasks are completed and new tasks are going to be given to the migrated version of the service chunk. Even in cases (c) it may be permissible to skip migrating information that can be recomputed by an external interaction which is with a proxy object (e.g., a browser quietly reinitializing or reestablishing a secure channel without interrupting a user-visible transaction, etc.).

Figure 9:
FIG. 9 illustrates an example of a local record table for a service consumer platform for service roaming between edge computing platforms, according to an embodiment.

FIG. 9 illustrates an example of a local record table 900 for a service consumer platform for service roaming between edge computing platforms, according to an embodiment. The local record table 900 may provide features as described in FIG. 8.

Local digital twins are used to enable a device/platform of each service consumer to keep a dynamic record of the service being consumed and the edge node providing the service. The local record table 900 may be used to hold the dynamic records that are constituted by a 4-tuple (service uniform resource identifier (URI), service chunk uniform resource name (URN), edge platform URN, and live timestamp). A record starts to be filled upon service consumption. The timestamp is updated during the service consumption. More tuples are added when service roaming takes place to move a service to a new edge platform(s). Tuples for the service are erased upon service completion.

Service design is cloud-native where the service URI provides a description of the service and is learned from metadata in early packets during service access. Each service is a collection of its service chunks and service execution may be tracked in terms of how each of its service components (service chunks) is statistically correlated to service requests, times of service execution, and other parameters based on nature of the service. A URN is used as a description for each service chunk. Each edge platform contributing to the service provision is also identified by a URN. A regional switch that connects the edge platform is responsible for generating the URNs for the edge platform and tracks the edge platform in its region, the URNs of the edge platforms, and the services provided by the edge platforms.

Figure 10:
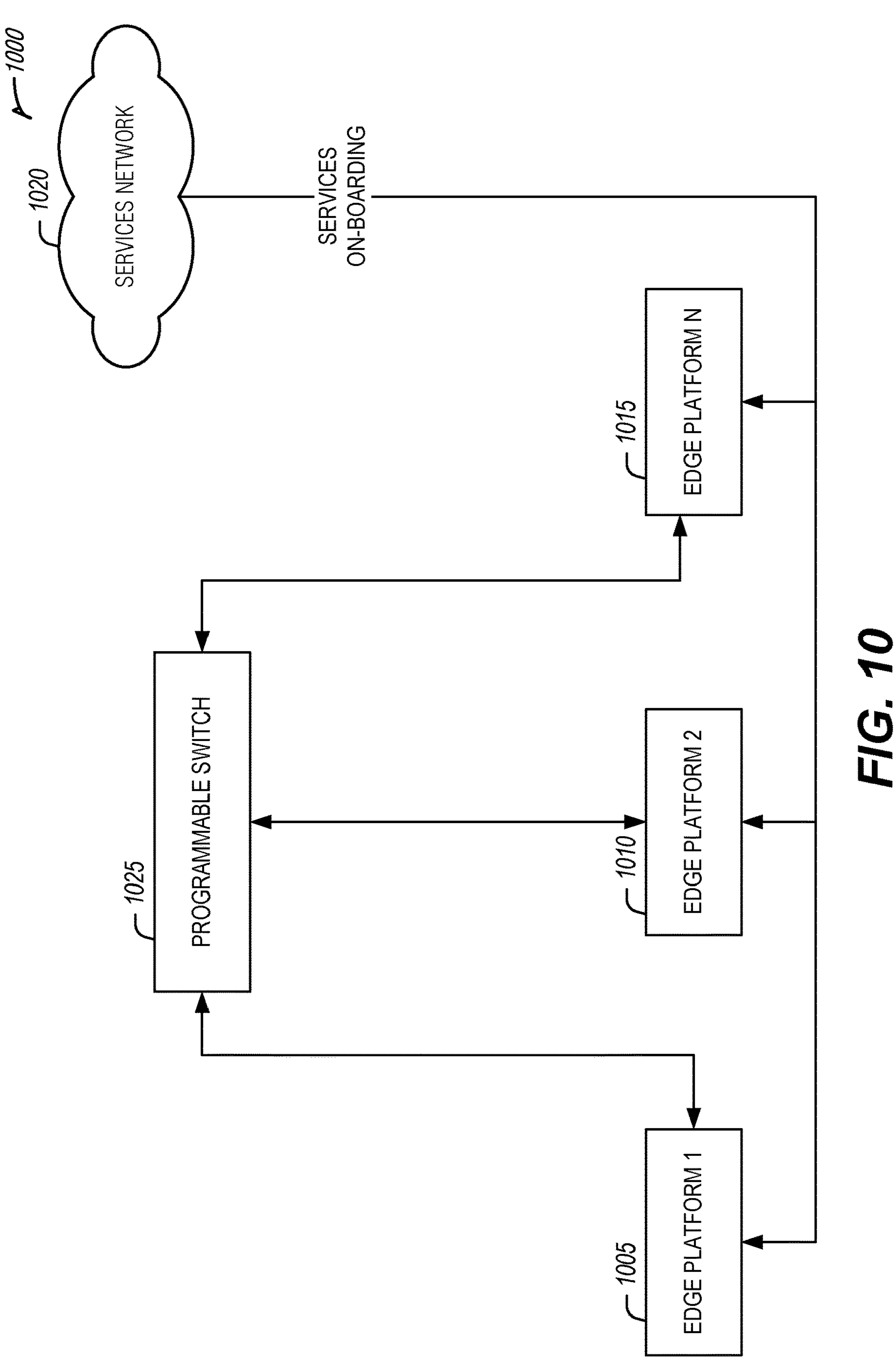
FIG. 10 illustrates an example of service onboarding for service roaming between edge computing platforms, according to an embodiment.

FIG. 10 illustrates an example of service onboarding 1000 for service roaming between edge computing platforms, according to an embodiment. The service onboarding 1000 may provide features as described in FIGS. 8 and 9.

Service roaming leverages an agile programmable infrastructure in which the service roaming among edge platforms is orchestrated by a programmable switch 1025. The programmable switch 1025 may be an edge node, a special purpose hardware device, or other device or service that provides for storage and execution of service roaming logic for connected edge platforms. For example, the programmable switch may be a programmable ethernet switch application specific integrated circuit (ASIC) that may connect to an edge node. The programmable switch 1025 may facilitate roaming by acting as a service roaming controller. Each group of edge platforms (e.g., edge platform 1 1005, edge platform 2 1010, and edge platform N 1015) are connected to the programmable switch 1025 for set-up during deployment and for connectivity and service management. In an example, the programmable switch 1025 may be a regional switch that provides service roaming for a geographic region, a physical region, or a logical region of an edge network. Selecting a switch topology within the edge infrastructure depends on a deployment scenario and required topology hierarchy. For example, the switch may connect a group of edge nodes in lateral fashion or a hierarchal fashion.

The group of edge platforms have a connection to a cloud service provider (CSP) 1020. In an example, the connection to the cloud 1020 may be through the programmable switch 1025 or may be via a separate connection path. In an example, the CSP 1020 may be a services network that provides service functionality to the group of edge platforms to deliver services to service consumers. The connection between the group of edge platforms and the cloud 1020 is used in services on-boarding and updating. The connection between the group of edge platforms and the programmable switch 1025 is used for early set-up of the group of edge platforms as well as service roaming management during the operation of the group of edge platforms.

Figure 11:
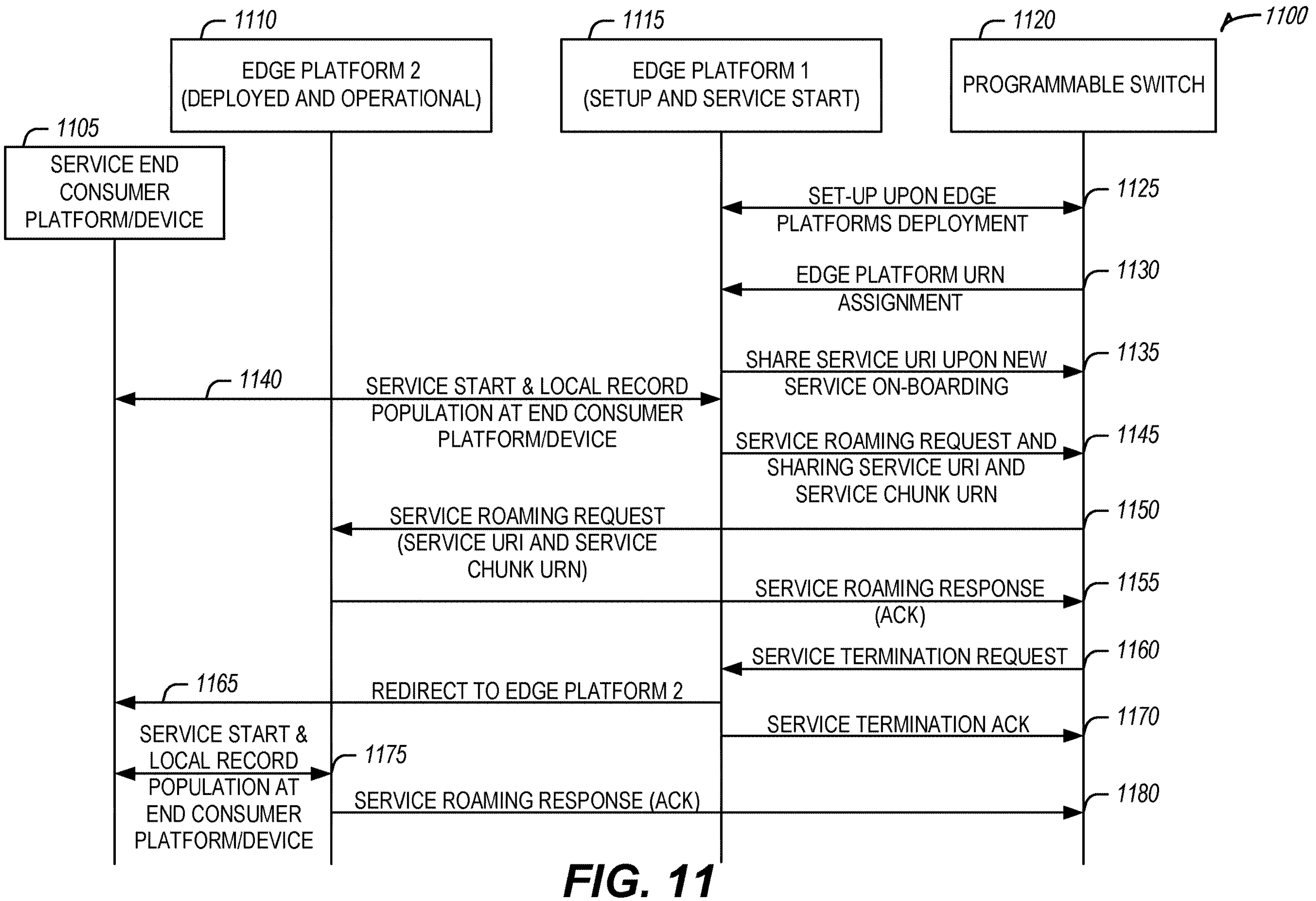
FIG. 11 illustrates an example of a data flow for edge platform setup and reactive service roaming for service roaming between edge computing platforms, according to an embodiment.

FIG. 11 illustrates an example of a data flow 1100 for edge platform setup and reactive service roaming for service roaming between edge computing platforms, according to an embodiment. The data flow 1100 may provide features as described in FIGS. 8 to 10.

The data flow 1100 illustrates set-up and service start at a first edge platform 1115 and a second edge platform 1110, along with service roaming management between a programmable switch 1120 and a service end consumer 1105 in a reactive service roaming scenario. The first edge platform 1115 and the second edge platform 1110 connect with the programmable switch 1120 in a region for initial set-up. Services on-boarding takes place for the first edge platform 1115 (e.g. at flow 1125). The second edge platform 1110 has already completed onboarding in the data flow 1100.

The first edge platform 1115 is assigned a URN by the programable switch 1120 during the set-up (e.g., at flow 1130). The first edge platform 1115 shares a service URI with the programmable switch 1120 upon on-boarding of a new service (e.g., at flow 1135). The service end consumer 1105 that is consuming the service adds the first edge platform 1115 URN, the service URI, and a URN for a service chunk extracted from early packets/messages during service start to its local record (e.g., the local record table 900 as described in FIG. 9, etc.) (e.g., at flow 1140).

When service roaming is triggered, the first edge platform 1115 sends a request to the programmable switch 1120 for managing service roaming and shares the URI for the service and the URN for the service chunk (e.g., at flow 1145). The programmable switch 1120 applies a make before break approach to manage service roaming by sending a service roaming request to the second edge platform 1110 in the region that satisfies criteria for service roaming (e.g., at flow 1150). Make before break is a configuration in the programmable switch 1120 in which a new connection path to the second edge platform 1110 is established before the connection to the connection path to the first edge computing platform 1115 has terminated. This prevents the service end consumer 1105 from experiencing an interruption in service delivery. The service roaming request includes the URI for the service and the URN for the service chunk.

The second edge platform 1110 receives the request and, if it is able to accommodate the request, sends an acknowledgement response to the programmable switch 1120 (e.g., at flow 1155). If the second edge platform 1110 receives the request and is unable to handle service roaming, the programmable switch 1120 polls other edge platforms that satisfy the criteria for service roaming to act as roaming targets. If the second edge platform 1110 is able to accommodate the request, the programmable switch 1120 sends a service termination request to the first edge platform 1115 (e.g., at flow 1160).

The first edge platform 1115 receives a service termination request and issues a server redirect to the second edge platform 1110 and may terminate execution of the service (e.g., at flow 1165) and send a service termination acknowledgement to the programmable switch 1120 (e.g., at flow 1170). The service end consumer 1105 a service chunk begins execution and the user roams to the second edge platform 1110 for continued execution of the service and updates its local record table accordingly (e.g., at flow 1175). The second edge platform 1110 transmits a service roaming response acknowledgement to confirm that the service transitioned successfully (e.g., at flow 1180).

Figure 12:
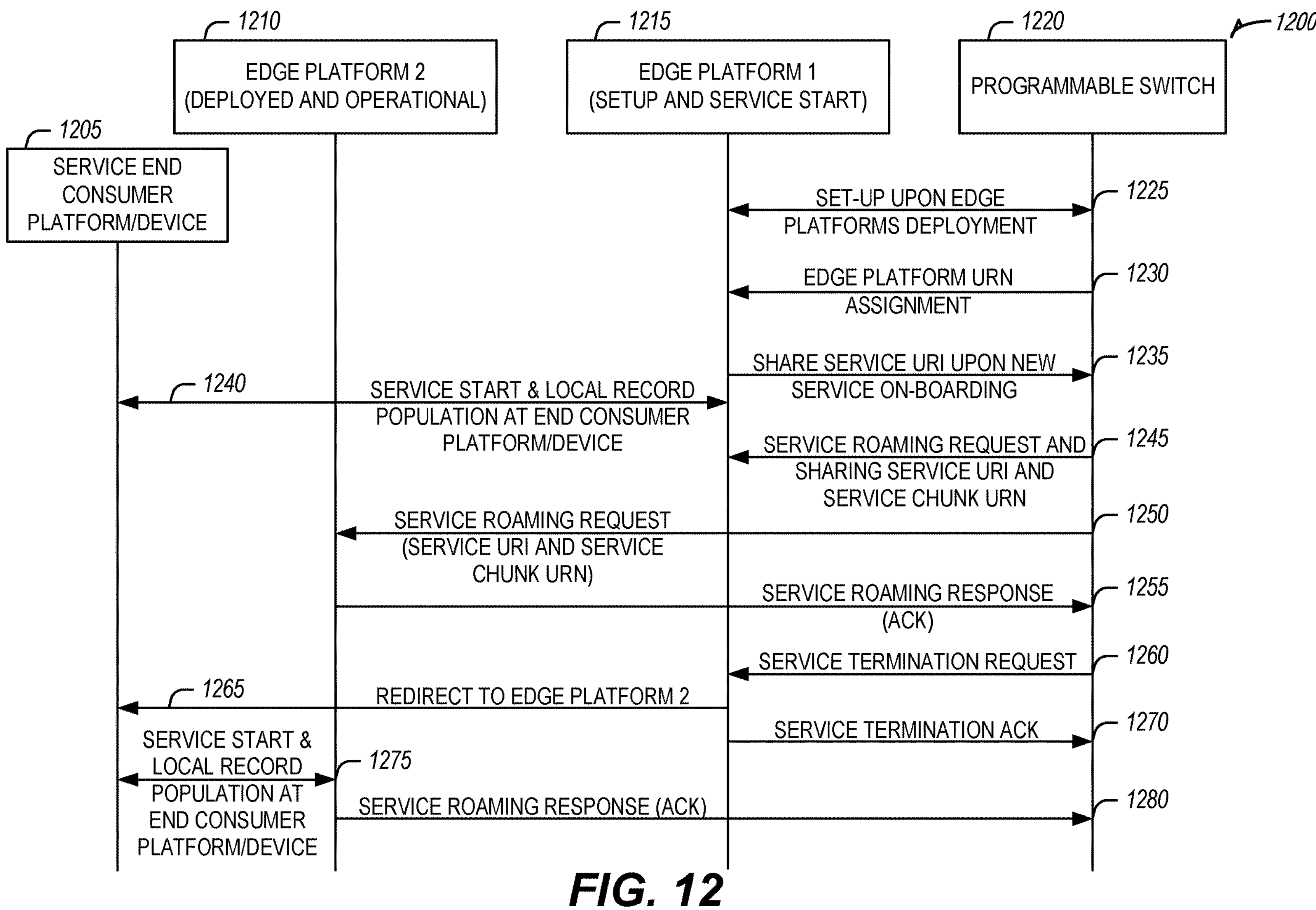
FIG. 12 illustrates an example of a data flow for edge platform setup and proactive service roaming for service roaming between edge computing platforms, according to an embodiment.

FIG. 12 illustrates an example of a data flow 1200 for edge platform setup and proactive service roaming for service roaming between edge computing platforms, according to an embodiment. The data flow 1200 may provide features as described in FIGS. 8 to 10.

The data flow 1200 illustrates set-up and service start at a first edge platform 1215 and a second edge platform 1210 and service roaming management between a programmable switch 1220 and a service end consumer 1205 in a proactive service roaming scenario. The first edge platform 1215 and the second edge platform 1210 connect with the programmable switch 1220 in a region for initial set-up. Services on-boarding takes place for the first edge platform 1215 (e.g., at flow 1225). The second edge platform 1210 has already completed onboarding in the data flow 1200.

The first edge platform 1215 is assigned a URN by the programable switch 1220 during the set-up (e.g., at flow 1230). The first edge platform 1215 shares a service URI with the programmable switch 1220 upon on-boarding of a new service (e.g., at flow 1235). The service end consumer 1205 that is consuming the service adds the first edge platform 1215 URN, the service URI, and a URN for a service chunk extracted from early packets/messages during service start to its local record (e.g., the local record table 900 as described in FIG. 9, etc.) (e.g., at flow 1240).

In contrast to the example of FIG. 11, when service roaming is triggered, the programmable switch 1220 sends a request to the first edge platform 1215 to enable service roaming and indicates the URI for the related service and the URN for the related service chunk (e.g., at flow 1245). The programmable switch 1220 applies a proactive make before break approach to manage service roaming by sending a service roaming request from the first edge platform 1215 to the second edge platform 1210 in the region that satisfies criteria for service roaming (e.g., at flow 1250). The service roaming request includes the URI for the service and the URN for the service chunk.

The second edge platform 1210 receives the request and, if it is able to accommodate the request, sends an acknowledgement response to the programmable switch 1220 (e.g., at flow 1255). The programmable switch 1220 sends a service termination request to the first edge platform 1215 (e.g., at flow 1260). If the second edge platform 1210 receives the request and is unable to handle service roaming, the programmable switch 1220 polls other edge platforms that satisfy the criteria for service roaming to act as roaming targets.

The first edge platform 1215 receives the service termination request and issues a server redirect to the second edge platform 1210 (e.g., at flow 1265) and may terminate service execution and send the programmable switch 1220 a service termination acknowledgement (e.g., at flow 1270). The service end consumer 1205 is roamed to the second edge platform 1210 for continued execution of the service and updates its local record table accordingly (e.g., at flow 1275). The second edge platform 1210 transmits a service roaming response acknowledgement to confirm that the service transitioned successfully (e.g., at flow 1280).

Information Centric Network (ICN) may be used to select target edge platforms as roaming targets based on optimal criteria for services roaming. ICN is applied between the first edge platform 1215 and the second edge platform 1210 and the programmable switch 1220. ICN may also be applied between switches in different regions. This allows on-demand discovery of edge platforms that offer the optimal criteria for services roaming.

The role of ICN interest packets, interest tables, and forwarding information bases is expanded for optimizing services roaming by evaluating information associated with edge platform resources (e.g., service availability, compute and storage capability, power consumption status, connectivity and bandwidth status, proximity to the user, etc.). Machine learning (ML) models may be applied to learn available information and to predict whether an edge platform may satisfy the optimal criteria to be considered a service roaming target.

A lightweight extension is made to service mesh to facilitate service roaming. Service chunks are the unit of distribution and roaming. Communication between service chunks is via an explicit API. Cloud native, sidecar-based service mesh architecture is extended to maintain efficiency and neutrality of the communication and the communication mechanism itself.

Service meshes, sidecars, or library proxies within each container may decouple service logic from communication elements. The service mesh is extended so that it is aware of service chunks and the service internal communications among the service chunks. The extended sidecars/library proxies decouple service chunks from mechanisms for dealing with remote service chunks making it appear to each service chunk that its sibling service chunks are local. When a service roaming decision is made, inter-chunk affinity plays a role. The extended mesh collects and processes telemetry to maximize grouping of service chunks during service roaming. In the case that a service chunk is migrated to a remote location from another peer service chunk, the sidecar transforms the gateway to that peer service chunk to a network address instead of a localhost IP address.

The extended sidecars/library proxies are guided by a service—service chunk association and translate inter-service communications to perform the service chunk—service chunk routing of traffic within the sidecar logic so that roaming does not introduce extra routing at both the service to service level and then within the service itself. In particular, the extended sidecars implement efficient broadcast/multicast schemes automatically (as guided by main logic pf a service).

The extended sidecars keep track of security keys of service logic, authentication/attestation materials, etc. so that the information may be automatically redistributed and employed suitably in peer-to-peer remote communications between the service chunks belonging to that service and service chunks belonging to another service. Communications between service chunks that belong to the same service are pre-provisioned with the extended sidecars so that authentication and session credentials do not have to be reestablished during remote execution of service chunks relative to one another. For example, pre-established symmetric keys may be used as needed.

Agile authentication may be employed to facilitate service roaming. Service roaming considers security and privacy in a stateless manner to avoid complexity of parameters. For mobile users, security contexts between user location and the user service profile are pinned to a roaming constellation so that the contexts do not get paged out or become stale with location change or workload affinity.

For stationary users where security contexts for user-user are maintained but for user-service they come and go, a service discovery service is used that charts a trajectory of roaming services to negotiate which credentials/trust anchors are needed when r-service comes into range to reduce latency. A service roaming service (e.g., operating on the programable switch 1025 as described in FIG. 10, etc.) establishes a security pre-context that contains necessary support credentials/trust anchors and attestation data in anticipation of service-user authentication/attestation protocols.

Roaming destination targets may be selected based on criteria that includes security equivalency between a potential target and a current servicing edge platform. For example, security capabilities such as use of secure enclaves, attestability, etc. of a target may be evaluated against capabilities of the servicing edge platform or requirements of the service or service consumer to determine equivalency of the target. For example, the servicing edge platform and a target edge platform may both be capable of providing secure enclaves for service execution while using different architectures but may be determined to be equivalent based on the capability of providing secure enclaves. Thus, a target may not need to be identically configured to be a suitable roaming destination for a roaming service.

Security operations may be conducted with potential roaming destinations early to reduce latency in the transfer of the service from the servicing edge platform to the target edge platform. For example, capability validation, attestation, and authentication of a target may be conducted prior to triggering a roaming request. For example, available targets may be identified that are available for roaming and the targets may be pre-configured to complete security processes. In an example, the pre-configuration may be completed by the programmable switch 1220 during onboarding of a target edge platform. This reduces security processes to be completed at the time of roaming reducing overall latency of migration of the service from a servicing edge platform to a target edge platform. Capability compatibility and credentialing may be defined in global policies that may be executed by the programmable switch 1220 in identifying and preparing target edge platforms to receive roaming services.

Figure 13:
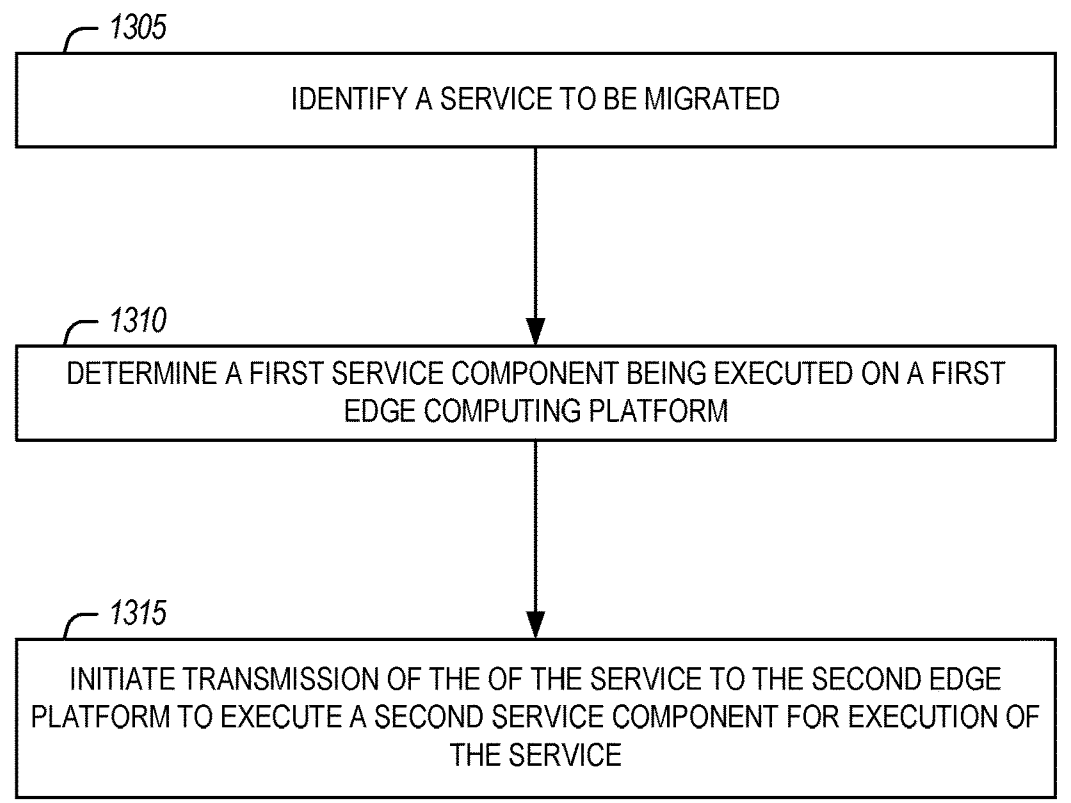
FIG. 13 illustrates a flow diagram of an example of a method for service roaming between edge computing platforms, according to an embodiment.

FIG. 13 illustrates a flow diagram of an example of a method for service roaming between edge computing platforms, according to an embodiment.

A service executing on a first edge computing platform is identified to be migrated to a second edge computing platform (e.g., at operation 1305). In an example, a roaming request may be received from the first edge computing platform. In an example, it may be identified that the service consumer is outside a proximity threshold for the first edge computing platform and that the service consumer is within the proximity threshold for the second edge computing platform. For example, a mobile device may have physically moved from proximity of one telecommunication provider to another telecommunication provider.

In an example, it may be determined that migration of the service from the first edge computing platform to the second edge computing platform would equalize computing loads among the first edge computing platform and the second edge computing platform. In an example, it may be identified that the service is to be delivered at a lowest cost based on resource utilization and it may be determined that cost of execution of the service by the second edge computing platform is lower than cost of execution of the service by the first edge computing platform. In an example, a first power utilization value may be calculated for execution of the service by the first edge computing platform and a second power utilization value may be calculated for execution of the service by the second edge computing platform. It may be determined that the second power utilization value is less than the first power utilization value.

In an example, first security capabilities of the first edge computing platform may be identified second security capabilities of the second edge computing platform may be identified. The first security capabilities may be compared to the second security capabilities using a capability equivalency policy to determine a level of equivalency of the second edge computing platform to the first edge computing platform. The second edge computing platform may be selected as a migration target based on the level of equivalency. The capability univalency policy may define capabilities that of edge platforms that may be considered equivalent (e.g., based on security policies, requirements, etc.). Thus, two edge platforms that offer capabilities determined to be equivalent based on the capability equivalency policy may be considered to be digital twins while not offering identical capabilities. In an example, security capabilities of the second edge computing platform may be identified. The security capabilities may be compared to security requirements for the service to determine that security capabilities of the second edge computing platform are compatible with the security requirements. The second edge computing platform may be selected as a migration target based on the security capabilities being compatible with the security requirements. In an example, a credentialing process may be initiated with the second edge computing platform before determining that the service executing on the first edge computing platform is to be migrated to the second edge computing platform. Continuing execution of the service may use results of the credentialing process. For example, the second edge computing platform may have competed attestation and the second service component may be transmitted to the second edge computing platform based on the attestation result.

A first service component is determined that is being executed by the first edge computing platform (e.g., at operation 1310). Transmission of the service to the second edge platform is initiated to execute a second service component for execution of the service. (e.g., at operation 1315). In an example, a second service component may be identified to be executed in delivery of the service to a service consumer. In an example, features of the service may be identified to be executed as a unit and the service may be partitioned into a set of service components that include the first service component and the second service component.

In an example, an indication may be received that the first service component has completed execution. An indication may be received that the first service component has completed execution and transmission of the service to the second edge computing platform continues execution of the service through execution of the second service component. In an example, a private state may be identified for execution of the service by the first edge computing platform. Private state data may be collected from the first edge computing platform and the private state data may be transmitted to the second edge computing platform.

In an example, the service consumer may be caused to update a local record table with a record for execution of the service by the second edge computing platform. In an example, the record may include a uniform resource identifier for the service, a uniform resource name (URN) for the second service component, a URN for the second edge computing platform, and a timestamp.

ADDITIONAL NOTES & EXAMPLES

Example 1 is an apparatus for service roaming in an edge network comprising: at least one processor; and memory including instructions that, when executed by the at least one processor, cause the at least one processor to perform operations to: identify a service executing on a first edge computing platform to be migrated to a second edge computing platform; determine a first service component of the service is being executed by the first edge computing platform; and initiate transmission of the service to the second edge platform to execute a second service component for execution of the service.

In Example 2, the subject matter of Example 1 includes, the memory further comprising instructions that, when executed by the at least one processor, cause the at least one processor to: identify the second service component of the service to be executed in delivery of the service to a service consumer; and receive an indication that the first service component has completed execution, wherein transmission of the service to the second edge computing platform continues execution of the service through execution of the second service component.

In Example 3, the subject matter of Examples 1-2 includes, wherein the instructions to identify the service executing on the first edge computing platform to be migrated to the second edge computing platform further comprises instructions that, when executed by the at least one processor, cause the at least one processor to perform operations to: identify that the service consumer is outside a proximity threshold for the first edge computing platform; and identify that the service consumer is within the proximity threshold for the second edge computing platform.

In Example 4, the subject matter of Examples 1-3 includes, wherein the instructions to identify the service executing on the first edge computing platform to be migrated to the second edge computing platform further comprises instructions that, when executed by the at least one processor, cause the at least one processor to perform operations to: determine that migration of the service from the first edge computing platform to the second edge computing platform achieves a load balancing objective among the first edge computing platform and the second edge computing platform.

In Example 5, the subject matter of Examples 1-4 includes, wherein the instructions to identify the service executing on the first edge computing platform to be migrated to the second edge computing platform further comprises instructions that, when executed by the at least one processor, cause the at least one processor to perform operations to: identify that the service is to be delivered using a cost objective for resource utilization; and determine that cost of execution of the service by the second edge computing platform is lower than cost of execution of the service by the first edge computing platform.

In Example 6, the subject matter of Examples 1-5 includes, wherein the instructions to identify the service executing on the first edge computing platform to be migrated to the second edge computing platform further comprises instructions that, when executed by the at least one processor, cause the at least one processor to perform operations to: calculate a first power utilization value for execution of the service by the first edge computing platform; calculate a second power utilization value for execution of the service by the second edge computing platform; and determine that the second power utilization value is less than the first power utilization value.

In Example 7, the subject matter of Examples 1-6 includes, wherein the instructions to identify the service executing on the first edge computing platform to be migrated to the second edge computing platform further comprises instructions that, when executed by the at least one processor, cause the at least one processor to perform operations to receive a roaming request from the first edge computing platform.

In Example 8, the subject matter of Examples 1-7 includes, the memory further comprising instructions that, when executed by the at least one processor, cause the at least one processor to: identify features of the service to be executed as a unit; and partition the service into a set of service components that include the first service component and the second service component.

In Example 9, the subject matter of Examples 1-8 includes, the memory further comprising instructions that, when executed by the at least one processor, cause the at least one processor to: identify a private state for execution of the service by the first edge computing platform; collect private state data from the first edge computing platform; and transmit the private state data to the second edge computing platform.

In Example 10, the subject matter of Examples 1-9 includes, the memory further comprising instructions that, when executed by the at least one processor, cause the at least one processor to: identify first security capabilities of the first edge computing platform; identify second security capabilities of the second edge computing platform; compare the first security capabilities to the second security capabilities using a capability equivalency policy to determine a level of equivalency of the second edge computing platform to the first edge computing platform; and select the second edge computing platform as a migration target based on the level of equivalency.

In Example 11, the subject matter of Examples 1-10 includes, the memory further comprising instructions that, when executed by the at least one processor, cause the at least one processor to: identify security capabilities of the second edge computing platform; compare the security capabilities to security requirements for the service to determine that security capabilities of the second edge computing platform are compatible with the security requirements; and select the second edge computing platform as a migration target based on the security capabilities being compatible with the security requirements.

In Example 12, the subject matter of Examples 1-11 includes, the memory further comprising instructions that, when executed by the at least one processor, cause the at least one processor to: cause the service consumer to update a local record table with a record for execution of the service by the second edge computing platform.

In Example 13, the subject matter of Example 12 includes, wherein the record includes a uniform resource identifier for the service, a uniform resource name (URN) for the second service component, a URN for the second edge computing platform, and a timestamp.

In Example 14, the subject matter of Examples 1-13 includes, the memory further comprising instructions that, when executed by the at least one processor, cause the at least one processor to: initiate a credentialing process with the second edge computing platform before identifying the service executing on the first edge computing platform to be migrated to the second edge computing platform, wherein continuing execution of the service uses results of the credentialing process.

In Example 15, the subject matter of Examples 1-14 includes, the memory further comprising instructions that, when executed by the at least one processor, cause the at least one processor to: determine that the second edge computing platform failed to execute the second service component; identify a third edge computing platform to execute the second service component; and initiate transmission of the service to the third edge platform to execute the second service component for execution of the service.

Example 16 is at least one non-transitory machine-readable medium including instructions for service roaming in an edge network that, when executed by at least one processor, cause the at least one processor to perform operations to: identify a service executing on a first edge computing platform to be migrated to a second edge computing platform; determine a first service component of the service is being executed by the first edge computing platform; and initiate transmission of the service to the second edge platform to execute a second service component for execution of the service.

In Example 17, the subject matter of Example 16 includes, instructions that, when executed by the at least one processor, cause the at least one processor to: identify the second service component of the service to be executed in delivery of the service to a service consumer; and receive an indication that the first service component has completed execution, wherein transmission of the service to the second edge computing platform continues execution of the service through execution of the second service component.

In Example 18, the subject matter of Examples 16-17 includes, wherein the instructions to identify the service executing on the first edge computing platform to be migrated to the second edge computing platform further comprises instructions that, when executed by the at least one processor, cause the at least one processor to perform operations to: identify that the service consumer is outside a proximity threshold for the first edge computing platform; and identify that the service consumer is within the proximity threshold for the second edge computing platform.

In Example 19, the subject matter of Examples 16-18 includes, wherein the instructions to identify the service executing on the first edge computing platform to be migrated to the second edge computing platform further comprises instructions that, when executed by the at least one processor, cause the at least one processor to perform operations to: determine that migration of the service from the first edge computing platform to the second edge computing platform achieves a load balancing objective among the first edge computing platform and the second edge computing platform.

In Example 20, the subject matter of Examples 16-19 includes, wherein the instructions to identify the service executing on the first edge computing platform to be migrated to the second edge computing platform further comprises instructions that, when executed by the at least one processor, cause the at least one processor to perform operations to: identify that the service is to be delivered using a cost objective for resource utilization; and determine that cost of execution of the service by the second edge computing platform is lower than cost of execution of the service by the first edge computing platform.

In Example 21, the subject matter of Examples 16-20 includes, wherein the instructions to identify the service executing on the first edge computing platform to be migrated to the second edge computing platform further comprises instructions that, when executed by the at least one processor, cause the at least one processor to perform operations to: calculate a first power utilization value for execution of the service by the first edge computing platform; calculate a second power utilization value for execution of the service by the second edge computing platform; and determine that the second power utilization value is less than the first power utilization value.

In Example 22, the subject matter of Examples 16-21 includes, wherein the instructions to identify the service executing on the first edge computing platform to be migrated to the second edge computing platform further comprises instructions that, when executed by the at least one processor, cause the at least one processor to perform operations to receive a roaming request from the first edge computing platform.

In Example 23, the subject matter of Examples 16-22 includes, instructions that, when executed by the at least one processor, cause the at least one processor to: identify features of the service to be executed as a unit; and partition the service into a set of service components that include the first service component and the second service component.

In Example 24, the subject matter of Examples 16-23 includes, instructions that, when executed by the at least one processor, cause the at least one processor to: identify a private state for execution of the service by the first edge computing platform; collect private state data from the first edge computing platform; and transmit the private state data to the second edge computing platform.

In Example 25, the subject matter of Examples 16-24 includes, instructions that, when executed by the at least one processor, cause the at least one processor to: identify first security capabilities of the first edge computing platform; identify second security capabilities of the second edge computing platform; compare the first security capabilities to the second security capabilities using a capability equivalency policy to determine a level of equivalency of the second edge computing platform to the first edge computing platform; and select the second edge computing platform as a migration target based on the level of equivalency.

In Example 26, the subject matter of Examples 16-25 includes, instructions that, when executed by the at least one processor, cause the at least one processor to: identify security capabilities of the second edge computing platform; compare the security capabilities to security requirements for the service to determine that security capabilities of the second edge computing platform are compatible with the security requirements; and select the second edge computing platform as a migration target based on the security capabilities being compatible with the security requirements.

In Example 27, the subject matter of Examples 16-26 includes, instructions that, when executed by the at least one processor, cause the at least one processor to: cause the service consumer to update a local record table with a record for execution of the service by the second edge computing platform.

In Example 28, the subject matter of Example 27 includes, wherein the record includes a uniform resource identifier for the service, a uniform resource name (URN)

for the second service component, a URN for the second edge computing platform, and a timestamp.

In Example 29, the subject matter of Examples 16-28 includes, instructions that, when executed by the at least one processor, cause the at least one processor to: initiate a credentialing process with the second edge computing platform before identifying the service executing on the first edge computing platform to be migrated to the second edge computing platform, wherein continuing execution of the service uses results of the credentialing process.

In Example 30, the subject matter of Examples 16-29 includes, instructions that, when executed by the at least one processor, cause the at least one processor to: determine that the second edge computing platform failed to execute the second service component; identify a third edge computing platform to execute the second service component; and initiate transmission of the service to the third edge platform to execute the second service component for execution of the service.

Example 31 is a method for service roaming in an edge network comprising: identifying a service executing on a first edge computing platform to be migrated to a second edge computing platform; determining a first service component of the service is being executed by the first edge computing platform; and initiating transmission of the service to the second edge platform to execute a second service component for execution of the service.

In Example 32, the subject matter of Example 31 includes, identifying a second service component of the service to be executed in delivery of the service to a service consumer; and receiving an indication that the first service component has completed execution, wherein transmission of the service to the second edge computing platform continues execution of the service through execution of the second service component.

In Example 33, the subject matter of Examples 31-32 includes, wherein identifying the service executing on the first edge computing platform to be migrated to the second edge computing platform further comprises: identifying that the service consumer is outside a proximity threshold for the first edge computing platform; and identifying that the service consumer is within the proximity threshold for the second edge computing platform.

In Example 34, the subject matter of Examples 31-33 includes, wherein identifying the service executing on the first edge computing platform to be migrated to the second edge computing platform further comprises: determining that migration of the service from the first edge computing platform to the second edge computing platform achieves a load balancing objective among the first edge computing platform and the second edge computing platform.

In Example 35, the subject matter of Examples 31-34 includes, wherein identifying the service executing on the first edge computing platform to be migrated to the second edge computing platform further comprises: identifying that the service is to be delivered using a cost objective for resource utilization; and determining that cost of execution of the service by the second edge computing platform is lower than cost of execution of the service by the first edge computing platform.

In Example 36, the subject matter of Examples 31-35 includes, wherein identifying the service executing on the first edge computing platform to be migrated to the second edge computing platform further comprises: calculating a first power utilization value for execution of the service by the first edge computing platform; calculating a second power utilization value for execution of the service by the second edge computing platform; and determining that the second power utilization value is less than the first power utilization value.

In Example 37, the subject matter of Examples 31-36 includes, wherein identifying the service executing on the first edge computing platform to be migrated to the second edge computing platform further comprises receiving a roaming request from the first edge computing platform.

In Example 38, the subject matter of Examples 31-37 includes, identifying features of the service to be executed as a unit; and partitioning the service into a set of service components that include the first service component and the second service component.

In Example 39, the subject matter of Examples 31-38 includes, identifying a private state for execution of the service by the first edge computing platform; collecting private state data from the first edge computing platform; and transmitting the private state data to the second edge computing platform.

In Example 40, the subject matter of Examples 31-39 includes, identifying first security capabilities of the first edge computing platform; identifying second security capabilities of the second edge computing platform; comparing the first security capabilities to the second security capabilities using a capability equivalency policy to determine a level of equivalency of the second edge computing platform to the first edge computing platform; and selecting the second edge computing platform as a migration target based on the level of equivalency.

In Example 41, the subject matter of Examples 31-40 includes, identifying security capabilities of the second edge computing platform; comparing the security capabilities to security requirements for the service to determine that security capabilities of the second edge computing platform are compatible with the security requirements; and selecting the second edge computing platform as a migration target based on the security capabilities being compatible with the security requirements.

In Example 42, the subject matter of Examples 31-41 includes, causing the service consumer to update a local record table with a record for execution of the service by the second edge computing platform.

In Example 43, the subject matter of Example 42 includes, wherein the record includes a uniform resource identifier for the service, a uniform resource name (URN) for the second service component, a URN for the second edge computing platform, and a timestamp.

In Example 44, the subject matter of Examples 31-43 includes, initiating a credentialing process with the second edge computing platform before identifying the service executing on the first edge computing platform to be migrated to the second edge computing platform, wherein continuing execution of the service uses results of the credentialing process.

In Example 45, the subject matter of Examples 31-44 includes, determining that the second edge computing platform failed to execute the second service component; identifying a third edge computing platform to execute the second service component; and initiate transmission of the service to the third edge platform to execute the second service component for execution of the service.

Example 46 is at least one machine-readable medium including instructions that, when executed by a machine, cause the machine to perform any method of Examples 31-45.

Example 47 is a system comprising means to perform any method of Examples 31-45.

Example 48 is a system for service roaming in an edge network comprising: means for identifying a service executing on a first edge computing platform to be migrated to a second edge computing platform; means for determining a first service component of the service is being executed by the first edge computing platform; and means for initiating transmission of the service to the second edge platform to execute a second service component for execution of the service.

In Example 49, the subject matter of Example 48 includes, means for identifying a second service component of the service to be executed in delivery of the service to a service consumer; and means for receiving an indication that the first service component has completed execution, wherein transmission of the service to the second edge computing platform continues execution of the service through execution of the second service component.

In Example 50, the subject matter of Examples 48-49 includes, wherein the means for identifying the service executing on the first edge computing platform to be migrated to the second edge computing platform further comprises: means for identifying that the service consumer is outside a proximity threshold for the first edge computing platform; and means for identifying that the service consumer is within the proximity threshold for the second edge computing platform.

In Example 51, the subject matter of Examples 48-50 includes, wherein the means for identifying the service executing on the first edge computing platform to be migrated to the second edge computing platform further comprises: means for determining that migration of the service from the first edge computing platform to the second edge computing platform achieves a load balancing objective among the first edge computing platform and the second edge computing platform.

In Example 52, the subject matter of Examples 48-51 includes, wherein the means for identifying the service executing on the first edge computing platform to be migrated to the second edge computing platform further comprises: means for identifying that the service is to be delivered using a cost objective for resource utilization; and means for determining that cost of execution of the service by the second edge computing platform is lower than cost of execution of the service by the first edge computing platform.

In Example 53, the subject matter of Examples 48-52 includes, wherein the means for identifying the service executing on the first edge computing platform to be migrated to the second edge computing platform further comprises: means for calculating a first power utilization value for execution of the service by the first edge computing platform; means for calculating a second power utilization value for execution of the service by the second edge computing platform; and means for determining that the second power utilization value is less than the first power utilization value.

In Example 54, the subject matter of Examples 48-53 includes, wherein the means for identifying the service executing on the first edge computing platform to be migrated to the second edge computing platform further comprises means for receiving a roaming request from the first edge computing platform.

In Example 55, the subject matter of Examples 48-54 includes, means for identifying features of the service to be executed as a unit; and means for partitioning the service into a set of service components that include the first service component and the second service component.

In Example 56, the subject matter of Examples 48-55 includes, means for identifying a private state for execution of the service by the first edge computing platform; means for collecting private state data from the first edge computing platform; and means for transmitting the private state data to the second edge computing platform.

In Example 57, the subject matter of Examples 48-56 includes, means for identifying first security capabilities of the first edge computing platform; means for identifying second security capabilities of the second edge computing platform; means for comparing the first security capabilities to the second security capabilities using a capability equivalency policy to determine a level of equivalency of the second edge computing platform to the first edge computing platform; and means for selecting the second edge computing platform as a migration target based on the level of equivalency.

In Example 58, the subject matter of Examples 48-57 includes, means for identifying security capabilities of the second edge computing platform; means for comparing the security capabilities to security requirements for the service to determine that security capabilities of the second edge computing platform are compatible with the security requirements; and means for selecting the second edge computing platform as a migration target based on the security capabilities being compatible with the security requirements.

In Example 59, the subject matter of Examples 48-58 includes, means for causing the service consumer to update a local record table with a record for execution of the service by the second edge computing platform.

In Example 60, the subject matter of Example 59 includes, wherein the record includes a uniform resource identifier for the service, a uniform resource name (URN) for the second service component, a URN for the second edge computing platform, and a timestamp.

In Example 61, the subject matter of Examples 48-60 includes, means for initiating a credentialing process with the second edge computing platform before identifying the service executing on the first edge computing platform to be migrated to the second edge computing platform, wherein continuing execution of the service uses results of the credentialing process.

In Example 62, the subject matter of Examples 48-61 includes, means for determining that the second edge computing platform failed to execute the second service component; means for identifying a third edge computing platform to execute the second service component; and means for initiating transmission of the service to the third edge platform to execute the second service component for execution of the service.

Example 63 is at least one machine-readable medium including instructions that, when executed by processing circuitry, cause the processing circuitry to perform operations to implement of any of Examples 1-62.

Example 64 is an apparatus comprising means to implement of any of Examples 1-62.

Example 65 is a system to implement of any of Examples 1-62.

Example 66 is a method to implement of any of Examples 1-62.

Example 67 is at least one machine-readable medium including instructions, which when executed by a machine, cause the machine to perform operations of any of the operations of Examples 1-62.

Example 68 is an apparatus comprising means for performing any of the operations of Examples 1-62.

Example 69 is a system to perform the operations of any of the Examples 1-62.

Example 70 is a method to perform the operations of any of the Examples 1-62.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An apparatus for service roaming in an edge network comprising:

at least one processor; and memory including instructions that, when executed by the at least one processor, cause the at least one processor to perform operations to:

identify a service executing on a first edge computing platform to be migrated to a second edge computing platform;

identify features of the service to be executed as a unit;

partition the service into a set of service components that include a first service component and a second service component;

determine that the first service component of the service is being executed by the first edge computing platform; and initiate transmission of the service to the second edge computing platform to execute the second service component for execution of the service.

2. The apparatus of claim 1, the memory further comprising instructions that, when executed by the at least one processor, cause the at least one processor to:

identify the second service component of the service to be executed in delivery of the service to a service consumer; and receive an indication that the first service component has completed execution, wherein transmission of the service to the second edge computing platform continues execution of the service through execution of the second service component.

3. The apparatus of claim 2, wherein the instructions to identify the service executing on the first edge computing platform to be migrated to the second edge computing platform further comprises instructions that, when executed by the at least one processor, cause the at least one processor to perform operations to:

identify that the service consumer is outside a proximity threshold for the first edge computing platform; and identify that the service consumer is within the proximity threshold for the second edge computing platform.

4. The apparatus of claim 1, wherein the instructions to identify the service executing on the first edge computing platform to be migrated to the second edge computing platform further comprises instructions that, when executed by the at least one processor, cause the at least one processor to perform operations to:

determine that migration of the service from the first edge computing platform to the second edge computing platform achieves a load balancing objective among the first edge computing platform and the second edge computing platform.

5. The apparatus of claim 1, wherein the instructions to identify the service executing on the first edge computing platform to be migrated to the second edge computing platform further comprises instructions that, when executed by the at least one processor, cause the at least one processor to perform operations to:

identify that the service is to be delivered using a cost objective for resource utilization; and determine that cost of execution of the service by the second edge computing platform is lower than cost of execution of the service by the first edge computing platform.

6. The apparatus of claim 1, wherein the instructions to identify the service executing on the first edge computing platform to be migrated to the second edge computing platform further comprises instructions that, when executed by the at least one processor, cause the at least one processor to perform operations to:

calculate a first power utilization value for execution of the service by the first edge computing platform;

calculate a second power utilization value for execution of the service by the second edge computing platform; and determine that the second power utilization value is less than the first power utilization value.

7. The apparatus of claim 1, wherein the instructions to identify the service executing on the first edge computing platform to be migrated to the second edge computing platform further comprises instructions that, when executed by the at least one processor, cause the at least one processor to perform operations to receive a roaming request from the first edge computing platform.

8. The apparatus of claim 1, the memory further comprising instructions that, when executed by the at least one processor, cause the at least one processor to:

identify a private state for execution of the service by the first edge computing platform;

collect private state data from the first edge computing platform; and transmit the private state data to the second edge computing platform.

9. The apparatus of claim 1, the memory further comprising instructions that, when executed by the at least one processor, cause the at least one processor to:

identify first security capabilities of the first edge computing platform;

identify second security capabilities of the second edge computing platform;

compare the first security capabilities to the second security capabilities using a capability equivalency policy to determine a level of equivalency of the second edge computing platform to the first edge computing platform; and select the second edge computing platform as a migration target based on the level of equivalency.

10. The apparatus of claim 1, the memory further comprising instructions that, when executed by the at least one processor, cause the at least one processor to:

identify security capabilities of the second edge computing platform;

compare the security capabilities to security requirements for the service to determine that security capabilities of the second edge computing platform are compatible with the security requirements; and select the second edge computing platform as a migration target based on the security capabilities being compatible with the security requirements.

11. The apparatus of claim 2, the memory further comprising instructions that, when executed by the at least one processor, cause the at least one processor to:

cause the service consumer to update a local record table with a record for execution of the service by the second edge computing platform.

12. The apparatus of claim 11, wherein the record includes a uniform resource identifier for the service, a uniform resource name (URN) for the second service component, a URN for the second edge computing platform, and a timestamp.

13. The apparatus of claim 1, the memory further comprising instructions that, when executed by the at least one processor, cause the at least one processor to:

initiate a credentialing process with the second edge computing platform before identifying the service executing on the first edge computing platform to be migrated to the second edge computing platform, wherein continuing execution of the service uses results of the credentialing process.

14. At least one non-transitory machine-readable medium including instructions for service roaming in an edge network that, when executed by at least one processor, cause the at least one processor to perform operations to:

identify a service executing on a first edge computing platform to be migrated to a second edge computing platform;

identify features of the service to be executed as a unit;

partition the service into a set of service components that include a first service component and a second service component;

determine that the first service component of the service is being executed by the first edge computing platform; and initiate transmission of the service to the second edge computing platform to execute the second service component for execution of the service.

15. The at least one non-transitory machine-readable medium of claim 14, wherein the instructions to identify the service executing on the first edge computing platform to be migrated to the second edge computing platform further comprises instructions that, when executed by the at least one processor, cause the at least one processor to perform operations to:

identify that a service consumer of the service is outside a proximity threshold for the first edge computing platform; and identify that the service consumer is within the proximity threshold for the second edge computing platform.

16. The at least one non-transitory machine-readable medium of claim 14, wherein the instructions to identify the service executing on the first edge computing platform to be migrated to the second edge computing platform further comprises instructions that, when executed by the at least one processor, cause the at least one processor to perform operations to:

determine that migration of the service from the first edge computing platform to the second edge computing platform achieves a load balancing objective among the first edge computing platform and the second edge computing platform.

17. The at least one non-transitory machine-readable medium of claim 14, wherein the instructions to identify the service executing on the first edge computing platform to be migrated to the second edge computing platform further comprises instructions that, when executed by the at least one processor, cause the at least one processor to perform operations to:

calculate a first power utilization value for execution of the service by the first edge computing platform;

calculate a second power utilization value for execution of the service by the second edge computing platform; and determine that the second power utilization value is less than the first power utilization value.

18. A method for service roaming in an edge network comprising:

identifying a service executing on a first edge computing platform to be migrated to a second edge computing platform;

identifying features of the service to be executed as a unit;

partitioning the service into a set of service components that include a first service component and a second service component;

determining that the first service component of the service is being executed by the first edge computing platform; and initiating transmission of the service to the second edge computing platform to execute the second service component for execution of the service.

19. The method of claim 18, further comprising:

identifying first security capabilities of the first edge computing platform;

identifying second security capabilities of the second edge computing platform;

comparing the first security capabilities to the second security capabilities using a capability equivalency policy to determine a level of equivalency of the second edge computing platform to the first edge computing platform; and selecting the second edge computing platform as a migration target based on the level of equivalency.

20. The method of claim 18, further comprising:

identifying security capabilities of the second edge computing platform;

comparing the security capabilities to security requirements for the service to determine that security capabilities of the second edge computing platform are compatible with the security requirements; and selecting the second edge computing platform as a migration target based on the security capabilities being compatible with the security requirements.

21. The method of claim 18, further comprising:

causing a service consumer of the service to update a local record table with a record for execution of the service by the second edge computing platform.

22. The method of claim 21, wherein the record includes a uniform resource identifier for the service, a uniform resource name (URN) for the second service component, a URN for the second edge computing platform, and a timestamp.

23. The method of claim 18, wherein identifying the service executing on the first edge computing platform to be migrated to the second edge computing platform further comprises:

identifying that a service consumer of the service is outside a proximity threshold for the first edge computing platform; and identifying that the service consumer is within the proximity threshold for the second edge computing platform.

24. The method of claim 18, wherein identifying the service executing on the first edge computing platform to be migrated to the second edge computing platform further comprises:

determining that migration of the service from the first edge computing platform to the second edge computing platform achieves a load balancing objective among the first edge computing platform and the second edge computing platform.

* * * * *